United States Patent
Yalla et al.

(10) Patent No.: US 9,792,821 B1
(45) Date of Patent: Oct. 17, 2017

(54) UNDERSTANDING ROAD SCENE SITUATION AND SEMANTIC REPRESENTATION OF ROAD SCENE SITUATION FOR RELIABLE SHARING

(71) Applicant: TOYOTA JIDOSHA KABUSHIKI KAISHA, Toyota-shi, Aichi-ken (JP)

(72) Inventors: Veeraganesh Yalla, Mountain View, CA (US); Rahul Ravi Parundekar, Sunnyvale, CA (US); Preeti J. Pillai, Sunnyvale, CA (US); Kentaro Oguchi, Menlo Park, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/081,756

(22) Filed: Mar. 25, 2016

(51) Int. Cl.
| | |
|---|---|
| G01C 21/00 | (2006.01) |
| G08G 1/00 | (2006.01) |
| G08G 1/16 | (2006.01) |
| G01C 21/34 | (2006.01) |
| G01C 21/36 | (2006.01) |
| G06K 9/00 | (2006.01) |
| G08G 1/0967 | (2006.01) |

(52) U.S. Cl.
CPC ......... *G08G 1/167* (2013.01); *G01C 21/3415* (2013.01); *G01C 21/3602* (2013.01); *G06K 9/00798* (2013.01); *G06K 9/00805* (2013.01); *G08G 1/09675* (2013.01); *G08G 1/096791* (2013.01); *G08G 1/163* (2013.01)

(58) Field of Classification Search
CPC combination set(s) only.
See application file for complete search history.

(56) References Cited

U.S. PATENT DOCUMENTS

| | | | |
|---|---|---|---|
| 7,974,748 B2 | 7/2011 | Goerick et al. | |
| 2005/0105776 A1 | 5/2005 | Luo et al. | |
| 2010/0168998 A1 | 7/2010 | Matsunaga | |
| 2013/0031479 A1* | 1/2013 | Flowers | G06F 8/00 715/716 |

(Continued)

OTHER PUBLICATIONS

Malisiewicz et al., "Beyond Categories: The Visual Memex Model for Reasoning About Object Relationships," Advances in neural information processing systems. Dec. 2009 (9 pages).

(Continued)

*Primary Examiner* — Yonel Beaulieu
(74) *Attorney, Agent, or Firm* — Patent Law Works LLP

(57) ABSTRACT

In an example embodiment, a computer-implemented method is disclosed that receives road scene data and vehicle operation data from one or more sensors associated with a first vehicle on a road segment; receives situation ontology data; automatically generates a semantic road scene description of the road segment using the road scene data, the vehicle operation data, and the situation ontology data; and transmits, via a communication network, the semantic road scene description to one or more other vehicles associated with the road segment. Automatically generating the semantic road scene description of the road segment can include determining lane-level activity information for each lane based on lane information and dynamic road object information and determining a lane-level spatial layout for each lane based on the lane information and the dynamic road object information.

33 Claims, 13 Drawing Sheets

(56) References Cited

U.S. PATENT DOCUMENTS

| | | | | |
|---|---|---|---|---|
| 2014/0075004 | A1* | 3/2014 | Van Dusen | H04L 41/04 709/223 |
| 2015/0261419 | A1* | 9/2015 | Flowers | G06F 8/00 715/720 |
| 2015/0278298 | A1* | 10/2015 | Boldyrev | G06F 17/278 707/754 |

OTHER PUBLICATIONS

Zitnick et al., "Adopting Abstract Images for Semantic Scene Understanding," IEEE Transactions on Pattern Analysis and Machine Intelligence, 2013 (12 pages).

* cited by examiner

UNDERSTANDING ROAD SCENE SITUATION AND SEMANTIC REPRESENTATION OF ROAD SCENE SITUATION FOR RELIABLE SHARING

BACKGROUND

The present disclosure relates to road scene processing. In a more particular example, the disclosure relates to technology for generating and exchanging road scene descriptions between vehicles Today, some newer vehicles rely on information about the vehicles' environment, such as the outside environment, for various different applications related to driver assistance, passenger safety and comfort, and communication with external services for diagnosis and maintenance purposes. However, these existing approaches generally only use the information to adapt their own vehicle behavior. These vehicles are typically unaware of the processing being performed by other nearby vehicles, and are often unable to react to oncoming situations because they are unable to detect those situations themselves, or to the extent they can detect various situations, the detection of those situations is often incomplete or inaccurate. As a result, the in-vehicle systems may provide passengers with inaccurate information and/or the driving assistance provided by the systems may not improve, or in some cases worsen, the driving experience or the safety of the user.

In some example applications, navigation systems require the user to be involved in sharing the current road scene information to other vehicles. In particular, these solutions may require the user to proactively report a traffic situation that other drivers should be aware of to a central communication infrastructure. The central communication infrastructure then broadcasts such information to other vehicles of the system. However, these existing techniques are subjected to the subjective observation and assessment of the road scene by the user who reports the situation. Also, these solutions potentially cause undesired distraction while the user is driving.

SUMMARY

According to one innovative aspect of the subject matter described in this disclosure, a system includes one or more processors and one or more memories storing instructions that, when executed by the one or more processors, cause the system to: receive, from one or more sensors associated with a first vehicle on a road segment, road scene data and vehicle operation data; receive situation ontology data; automatically generate a semantic road scene description of the road segment using the road scene data, the vehicle operation data, and the situation ontology data; and transmit, via a communication network, the semantic road scene description to one or more other vehicles associated with the road segment.

In general, another innovative aspect of the subject matter described in this disclosure may be embodied in methods that include receiving, from one or more sensors associated with a first vehicle on a road segment, road scene data and vehicle operation data; receiving situation ontology data; automatically generating a semantic road scene description of the road segment using the road scene data, the vehicle operation data, and the situation ontology data; and transmitting, via a communication network, the semantic road scene description to one or more other vehicles associated with the road segment.

Other aspects include corresponding methods, systems, apparatus, and computer program products for these and other innovative aspects.

These and other implementations may each optionally include one or more of the following features and/or operations. For instance, the features and/or operations include: that the situation ontology data includes one or more predefined semantic terms for describing a road scene situation; detecting one or more static road objects based on the road scene data, and determining one or more lanes of the road segment based on the detected static road objects; that determining the one or more lanes of the road segment includes receiving map data associated with the road segment, and determining the one or more lanes of the road segment based on the map data and the detected static road objects; detecting one or more dynamic road objects based on the road scene data, determining lane-level activity information for each lane based on lane information and dynamic road object information, and determining a lane-level spatial layout for each lane based on the lane information and the dynamic road object information; that determining the lane-level activity information includes spatially and temporally monitoring movement and lane position of the one or more dynamic road objects, and generating the lane-level activity information for each lane based on the monitored movement and the monitored lane position of the one or more dynamic road objects; that spatially and temporally monitoring the movement and the lane position includes assigning a unique object identifier to each of the detected dynamic road objects, and spatially and temporally monitoring the movement and the lane position of the dynamic road objects based on the assigned object identifier; that determining the lane-level spatial layout for each lane includes determining a number of dynamic road objects in each lane based on the road scene data, and determining the lane-level spatial layout for each lane based on the number of dynamic road objects in each lane and a sensor range of the one or more sensors associated with the first vehicle; determining one or more of a locality attribute, a lighting attribute, a weather attribute, and a scene-level context associated with the road segment based on the road scene data, determining a road surface condition associated with the road segment based on the weather attribute and the vehicle operation data, determining lane-level activity information for each lane, determining a lane-level spatial layout for each lane, and wherein the generated semantic road scene description of the road segment includes one or more of the locality attribute, the lighting attribute, the weather attribute, the scene-level context, the road surface condition, the lane-level activity information for each lane, and the lane-level spatial layout for each lane associated with the road segment; receiving, from two or more vehicles associated with the road segment, two or more other semantic road scene descriptions, respectively, aligning the two or more other semantic road scene descriptions based on one or more aspects in each of the two or more other semantic road scene descriptions, determining one or more outside conditions relevant to the road segment based on the aligned semantic road scene descriptions, and executing one or more interactive routines based on the one or more outside conditions; that at least one aspect of each of the two or more other semantic road scene descriptions is lane information, and aligning the two or more other semantic road scene descriptions includes aligning the two or more other semantic road scene descriptions based on the lane information included in each of the two or more other semantic road scene descriptions; receiving map data associated with the road segment, and that aligning the two or more other semantic road scene descriptions includes aligning the two or more other semantic road scene descriptions based on the lane information included in each of the two or more other semantic road scene descriptions and the map data; that executing the one or more interactive routines includes generating navigational guidance based on the one or more outside conditions, and providing the navigational guidance to a user of the first vehicle; that the one or more other vehicles are within a radio frequency communication range with the first vehicle and the communication network is one of a vehicle to vehicle network and a vehicle to infrastructure network; that the road scene data includes image data captured by one or more optical sensors.

The novel technology for understanding and sharing road scene situations presented in this disclosure is particularly advantageous in a number of respects. For example, the technology described herein enables the semantic description of current road scene situation to be reliably and automatically exchanged between multiple vehicles and/or infrastructures.

As a further example, the technology disclosed herein includes spatio-temporal information in the semantic description of the current situation by taking into account the object-to-object relationships in the scene, and aggregating information from multiple objects in the scene as well as the context of the scene itself. The present technology can therefore provide a comprehensive understanding of current road scene situations for use in various applications to improve driver safety and driving experience. Furthermore, the automatic aggregation and transmission of road scene information from multiple vehicles without user intervention can also avoid causing unnecessary distractions to the user when driving.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can processes and understand the current road scene situation, and represent the current road scene situation in a format that can be exchanged easily between multiple vehicles using vehicle-to-vehicle (V2V) protocols and/or infrastructures using vehicle-to-infrastructure/infrastructure-to-vehicle (V2I/I2V) protocols. As described in further detail below, in some embodiments, a semantic road scene description to be exchanged may describe various aspects of the environment of a given vehicle, including the inside and/or outside environment. For example, the description may include one or more outside conditions associated with a road segment on which the vehicle is located and/or traveling. Non-limiting examples of such conditions include current scene compositions, individual object attributes (e.g., color and model of the vehicle), activities performed by one or more road objects present in the scene and associated activity types, object-to-object relationships within the scene, scene parameters, etc. Non-limiting examples of scene parameters include a weather condition, lighting condition, type of locality, ease-of-drive metric, available road area for traversal, etc. A vehicle receiving a semantic description from another vehicle within communication range may extract relevant information from the semantic road scene description, and process it to provide predictive services to its passenger(s).

Figure 1:
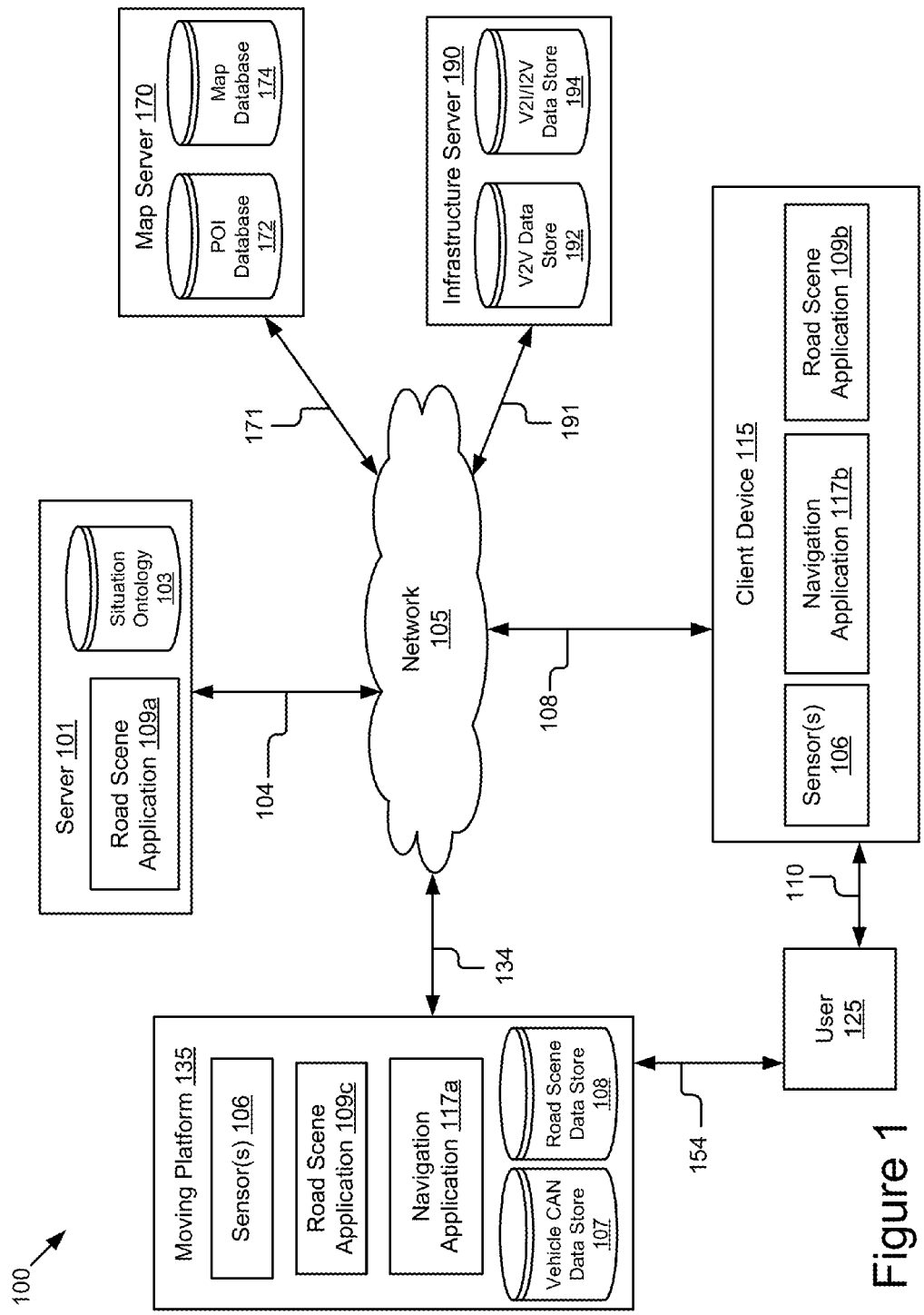
FIG. 1 is a block diagram of an example system for processing and understanding road scene situations, and generating and sharing semantic road scene descriptions.

FIG. 1 is a block diagram of an example system 100 for processing and understanding a road scene situation, and generating and sharing a semantic road scene description associated with a road segment. The illustrated system 100 includes a server 101, a map server 170, an infrastructure server 190, a client device 115, and a moving platform 135. The entities of the system 100 are communicatively coupled via a network 105. It should be understood that the system 100 depicted in FIG. 1 is provided by way of example and the system 100 and/or further systems contemplated by this disclosure may include additional and/or fewer components, may combine components and/or divide one or more of the components into additional components, etc. For example, the system 100 may include any number of moving platforms 135, client devices 115, infrastructure servers 190, servers 170, or servers 101. Additionally or alternatively, the system 100 may include a speech server for receiving and processing speech commands from a user, a search server for providing search results matching search queries, etc.

The network 105 can be a conventional type, wired or wireless, and may have numerous different configurations including a star configuration, token ring configuration, or other configurations. Furthermore, the network 105 may include one or more local area networks (LAN), wide area networks (WAN) (e.g., the Internet), public networks, private networks, virtual networks, peer-to-peer networks, and/or other interconnected data paths across which multiple devices may communicate. For instance, the network 105 may include a vehicle-to-vehicle network, a vehicle-to-infrastructure/infrastructure-to-vehicle network, etc.

The network 105 may also be coupled to or include portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the network 105 is a wireless network using a connection such as DSRC, WAVE, 802.11p, a 3G, 4G, 5G+ network, WiFi™, or any other wireless networks. Although FIG. 1 illustrates a single block for the network 105 that couples to the server 101, the map server 170, the infrastructure server 190, the client device 115 and the moving platform 135, it should be understood that the network 105 may in practice comprise any number of combination of networks, as noted above.

The server 101 can include a hardware and/or virtual server that includes a processor, a memory, and network communication capabilities (e.g., a communication unit). The server 101 may be communicatively coupled to the network 105, as reflected by signal line 104. In some embodiments, the server 101 can send and receive data to and from one or more of the map server 170, the infrastructure server 190, the client device 115 and the moving platform 135. The server 101 may include an instance of the road scene application 109a and a situation ontology database 103, as discussed further elsewhere herein.

The situation ontology database 103 may store terminology data for describing road scene situation. In FIG. 1, the server 101 is shown as including the situation ontology database 103, however it should be understood that the moving platform 135 and/or client device 115, and/or another component of the system 100, may additionally and/or alternatively store the terminology data. For instance, the moving platform 135 and/or client device 115 may include an instance of the situation ontology database 103, may cache data from the situation ontology database 103 (e.g., download the terminology data at various intervals), etc. For instance, the terminology data may be pre-stored/installed in the moving platform 135, stored and/or refreshed upon setup or first use, replicated at various intervals, etc. In further embodiments, data from the situation ontology database 103 may be requested/downloaded at runtime. Other suitable variations are also possible and contemplated.

Figure 11:
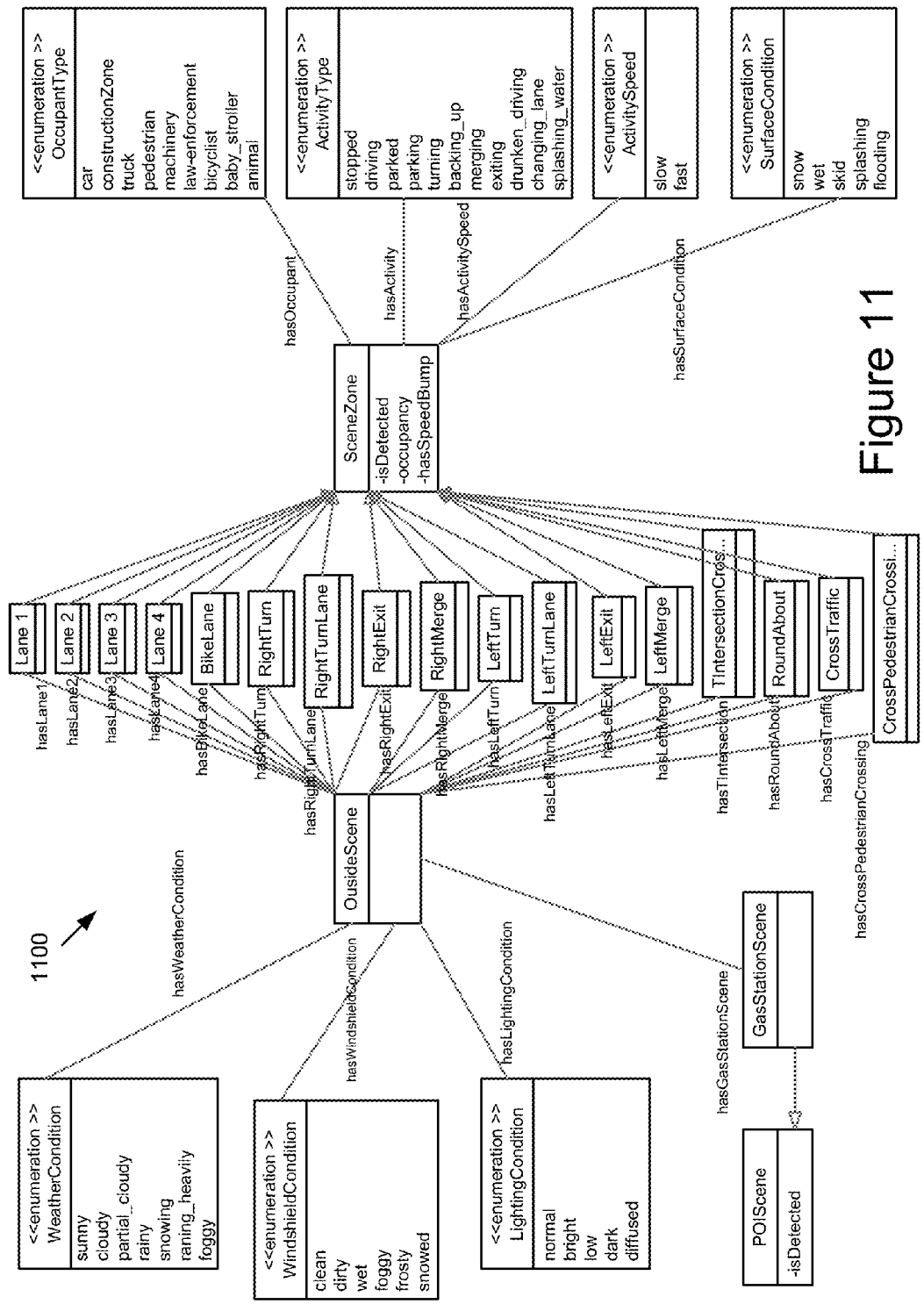
FIG. 11 depicts an example of situation ontology data.

The terminology data may reflect a language framework. FIG. 11 depicts an example of situation ontology data stored in the situation ontology database 103. As shown, the situation ontology data may include predefined semantic terms for describing weather condition, lighting condition, windshield condition, road surface condition, road object type, road object activity, road object relative speed, etc. For example, in order to describe weather condition, a semantic road scene description may include one or more of the following words: sunny, cloudy, partially cloudy, rainy, snowing, raining heavily, and foggy. As another example, the semantic road scene description may quantify the relative movement of a particular moving platform 135 as slow or fast. In some embodiments, these specific, predefined semantic terms provide a common terminology basis for communication between moving platform 135s and between moving platform 135s and infrastructures in the system 100.

As a result, these entities can generate semantic road scene descriptions that are mutually applicable, interpretable and understandable to each other. In some embodiments, situation ontology database 103 may include or be part of a database management system (DBMS) for storing and providing access to data.

The client device 115 is a computing device that includes a memory, a processor, and a communication unit. The client device 115 is coupleable to the network 105 and can send and receive data to and from one or more of the server 101, map server 170, the infrastructure server 190 and the moving platform 135 (and/or any other components of the system coupled to the network 105). Non-limiting examples of a client device 115 include a laptop computer, a desktop computer, a tablet computer, a mobile telephone, a personal digital assistant (PDA), a mobile email device, or any other electronic device capable of processing information and accessing a network 105. In some embodiments, the client device may include one or more sensors 106.

In some embodiments, the client device 115 may include an instance of a navigation application 117b, which utilizes the current road scene information extracted from the semantic road scene description to provide navigation instructions to the user. The user 125 can interact with the client device 115, as illustrated by line 110. Although FIG. 1 illustrates one client device 115, the system 100 can include one or more client devices 115.

The moving platform 135 includes a computing device having memory, a processor, and a communication unit. Examples of such a processor may include an electronic control unit (ECU) or other suitable processor, which is coupled to other components of the moving platform 135, such as one or more sensors, actuators, motivators, etc. The moving platform 135 may be coupled to the network 105 via signal line 134, and may send and receive data to and from one or more of the server 101, map server 170, the infrastructure server 190 and the client device 115. In some embodiments, the moving platform 135 is capable of transport from one point to another. Non-limiting examples of a mobile platform 135 include a vehicle, an automobile, a bus, a boat, a plane, a bionic implant, or any other mobile system with non-transitory computer electronics (e.g., a processor, a memory or any combination of non-transitory computer electronics). The user 125 can interact with the moving platform 135, as reflected by line 154. The user 125 may be a human user operating the moving platform 135. For example, the user 125 may be a driver of a vehicle.

The moving platform 135 can include one or more sensors 106, a vehicle CAN (Controller Area Network) data store 107, a road scene data storage 108, and an instance of a navigation application 117a. Although FIG. 1 illustrates one moving platform 135, the system 100 can include one or more moving platforms 135.

The vehicle CAN data store 107 stores various types of vehicle operation data (also sometimes referred to as vehicle CAN data) being communicated between different modules of the moving platform 135 using the Controlled Area Network (CAN) of the moving platform 135. In some embodiments, the vehicle operation data is collected from multiple sensors 106 coupled to different components of the moving platform 135 for monitoring operating states of these components. Examples of the vehicle CAN data include, but are not limited to, speed, acceleration, deceleration, wheel speed (Revolutions Per Minute—RPM), wheel slip, traction control information, windshield wiper control information, steering angle, braking force, etc. In some embodiments, the vehicle operation data may also include location data (e.g., GPS (Global Positioning System) coordinates) describing current location of the moving platform 135. Other standard vehicle operation data is also contemplated. In some embodiments, vehicle CAN data store 107 may be part of a data storage system (e.g., a standard data or database management system) for storing and providing access to data.

The road scene data storage 108 stores road scene data captured by one or more sensors 106 of the moving platform 135. The road scene data is data that describes the outside environment of the moving platform 135 including the roadway and other objects located along the roadway. In some embodiments, one or more first sensors 106 of the moving platform 135 may capture sensor data related to the operation of the moving platform 135. This sensor data may be processed and stored as vehicle operation data in the vehicle CAN data store 107 and/or provide to the road scene application 109, as discussed elsewhere herein. Further non-limiting examples of the vehicle operation data include, but are not limited to, speed, acceleration, deceleration, wheel speed, wheel slip, traction control information, windshield wiper control information, steering angle, braking force, etc. In some further embodiments, one or more second sensors 106 of the moving platform 135 may capture scene data describing the environment outside and/or surrounding the moving platform 135. This scene data may be processed and stored as road scene data in the road scene data storage 108 and/or provided to the road scene application 109, as discussed elsewhere herein.

In a further example related to road scene data, the sensors 106 may include one or more optical sensors configured to record images including video images and still images of an indoor or outdoor environment; may record frames of a video stream using any applicable frame rate, and may encode and/or process the video and still images captured using any applicable methods; can capture images of surrounding environments within their sensor range. For instance, in the context of a moving platform, the sensors 106 can capture the environment around the moving platform 135 including roads, sky, mountains, roadside structure, buildings, trees, dynamic road objects (e.g., surrounding moving platform 135s, pedestrians, road workers, etc.) and/or static road objects (e.g., lanes, traffic signs, road markings, traffic cones, barricades, etc.), etc. In some embodiments, the sensors 106 may be mounted to sense in any direction (forward, rearward, sideward, upward, downward, facing etc.) relative to the path of the moving platform 136. In some embodiments, one or more sensors 106 may be multidirectional (e.g., LIDAR).

The server 101, the moving platform 135, and/or the client device 115 may include instances 109a, 109b, and 109c of the road scene application (also referred to herein as simply 109). In some configurations, the road scene application 109 may be distributed over the network 105 on disparate devices in disparate locations, in which case the client device 115, the moving platform 135, and/or the server 101 may each include an instance of the road scene application 109 comprising aspects (same, similar, different, etc.) of the road scene application 109. For example, each instance of the road scene application 109a, 109b, and 109c may comprise one or more of the sub-components depicted in FIG. 2B, and/or different variations of theses sub-components, which are discussed in further detail below. In some configurations, the road scene application 109 may be a native application comprising all of the elements depicted in FIG. 2B, for example.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

The road scene application 109 includes software and/or or hardware logic executable to process road scene data, deduce road scene situations, generate semantic road scene descriptions, process road scene descriptions from other moving platform 135s, etc. In some embodiments, the road scene application 109 can be implemented using software executable by one or more processors of one or more computer devices, using hardware, such as but not limited to a field-programmable gate array (FPGA), an application-specific integrated circuit (ASIC), etc., and/or a combination of hardware and software, etc. The road scene application 109 is described below in more detail with reference to at least FIGS. 2-8.

The navigation application 117 includes software and/or hardware logic executable to provide navigation instructions to a user. In some embodiments, the scene utilization application 117 can be implemented using software executable by one or more processors of one or more computer devices, using hardware, such as but not limited to a field-programmable gate array (FPGA), an application-specific integrated circuit (ASIC), etc., and/or a combination of hardware and software, etc.

The navigation application 117 may utilize data from a sensor 106, such as a geo-location transceiver (e.g., GPS), configured to receive and provide location data (e.g., GPS, triangulation, etc.) for a corresponding computing device. For example, the moving platform 135 and/or the client device 115 may be equipped with such a geo-location transceiver and the corresponding instance of the navigation application 117 may be configured to receive and process location data from such a transceiver.

In some embodiments, an instance of a road scene application 109 operating on a first moving platform 135 may receive road scene description(s) from other moving platform(s) 135 (e.g., within communication range of the first moving platform 135), and process the received road scene description(s), along with a locally generated road scene description in some cases, to determine a comprehensive, current road scene situation relevant to the first moving platform 135, and more specifically, the user interacting with the moving platform 135. By way example and not limitation, an instance of a navigation application 117 operating on the first moving platform 135 and/or a client device 115 of the user can provide navigation instructions based on the current road scene situation determined by the road scene application 109 to the user via one or more output devices of the mobile platform 135 and/or a client device 115 (e.g., a speaker system, a graphical user interface displayed on a display, etc.). In some cases, the received road scene descriptions may be received from instances of the road scene application 109 located at some point in time within a certain range of the first moving platform 135, as discussed elsewhere herein.

The sensors 106 may include any type of sensors suitable for the moving platform 135 and/or the client device 115. The sensors 106 may be configured to collect any type of data suitable to determine characteristics of a computing device and/or its surrounding environment. Non-limiting examples of sensors 106 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, transceivers, sonar sensors, ultrasonic sensors, touch sensors, proximity sensors, etc.

A processor (e.g., see FIG. 2) of the moving platform 135 and/or the client device 115 may receive and process the sensor data. In the context of a moving platform 135, the processor may be an electronic control unit (ECU) implemented in a moving platform 135 such as a car, although other moving platform types are also contemplated. The ECU may receive and store the sensor data as vehicle operation data in the vehicle CAN data store 107 for access and/or retrieval by the road scene application 109. In further examples, the vehicle operation data more directly provided to the road scene application 109 (e.g., via the vehicle bus, via the ECU, etc., upon being received and/or processed). Other suitable variations are also possible and contemplated. As a further example, one or more sensors 106 can capture image data from the moving platform 135 (e.g., a vehicle) travelling on a road segment, where the image data depicts a scene including the road segment. The road scene application 109 may receive the image data (e.g., real-time video stream, a series of static images, etc.) from the sensor(s) 106 (e.g., via the bus, ECU, etc.) and process it to determine the current road scene situation, as discussed further elsewhere herein.

The map server 170 includes a hardware and/or virtual server having a processor, a memory, and network communication capabilities. In some embodiments, the map server 170 receives and sends data to and from one or more of the server 101, the infrastructure server 190, the moving platform 135, and the client device 115. For example, the map server 170 sends data describing a map of a geo-spatial area that includes a particular road segment to one or more of the road scene application 109 and the navigation application 117. The map server 170 is communicatively coupled to the network 105 via signal line 171. In some embodiments, the map server 170 includes a point of interest (POI) database 172, and a map database 174.

The point of interest (POI) database 172 stores data describing points of interest (POIs) for various geographic regions. For example, the POI database 172 stores data describing tourist attractions, hotels, restaurants, gas stations, university stadiums, landmarks, etc., along various road segments. In some embodiments, the POI database 172 may include a database management system (DBMS) for storing and providing access to data. The map database 174 stores data describing maps associated with one or more geographic regions. In some embodiments, map data may describe the one or more geographic regions at street level. For example, the map data may include information describing one or more lanes associated with a particular road. More specifically, the map data may describe the direction of travel of a road, the number of lanes on that road, exits and entrances to that road, whether one or more lanes have special status (e.g., are carpool lanes), the condition of the road in those lanes, traffic and/or accident data for those lanes, traffic controls associated with those lanes, (e.g., lane markings, pavement markings, traffic signals, traffic signs, etc.), etc. In some embodiments, the map database 174 may include and/or be associated with a database management system (DBMS) for storing and providing access to data.

The infrastructure server 190 includes a hardware and/or virtual server having a processor, a memory, and network communication capabilities. In some embodiments, the infrastructure server 190 receives and sends data to and from one or more of the server 101, the map server 170, the moving platform 135 and the client device 115. In some embodiments, the infrastructure server 190 and/or the infrastructure components (e.g., towers, etc.) to which it is coupled, utilize V2I/I2V communication protocols for exchanging data with moving platform 135s. A non-limiting example of the infrastructure components include road-side units, e.g., a static station deployed along the roadway, etc. The infrastructure server 190 may store the data received and/or exchanged by it, such as road scene descriptions transmitted by the moving platforms 135 to other moving platforms (V2V data) or to the infrastructure server 190 (V2I/I2V data), in one or more corresponding data repositories, such as the V2V data store 192, the V2I/I2V data store 194, etc. In some embodiments, the V2V data store 192 and/or the V2I/I2V data store 194 may include and/or be associated with a database management system (DBMS) for storing and providing access to data. The moving platform 135s and the infrastructures may be communicatively coupled to V2V communication network and/or a V2I/I2V communication network included in the network 105 via wireless connections. In some embodiments, the moving platform 135s and the infrastructures may transmit and receive messages to and from other entities coupled to the network that are within their radio frequency communication range.

Figure 2A:
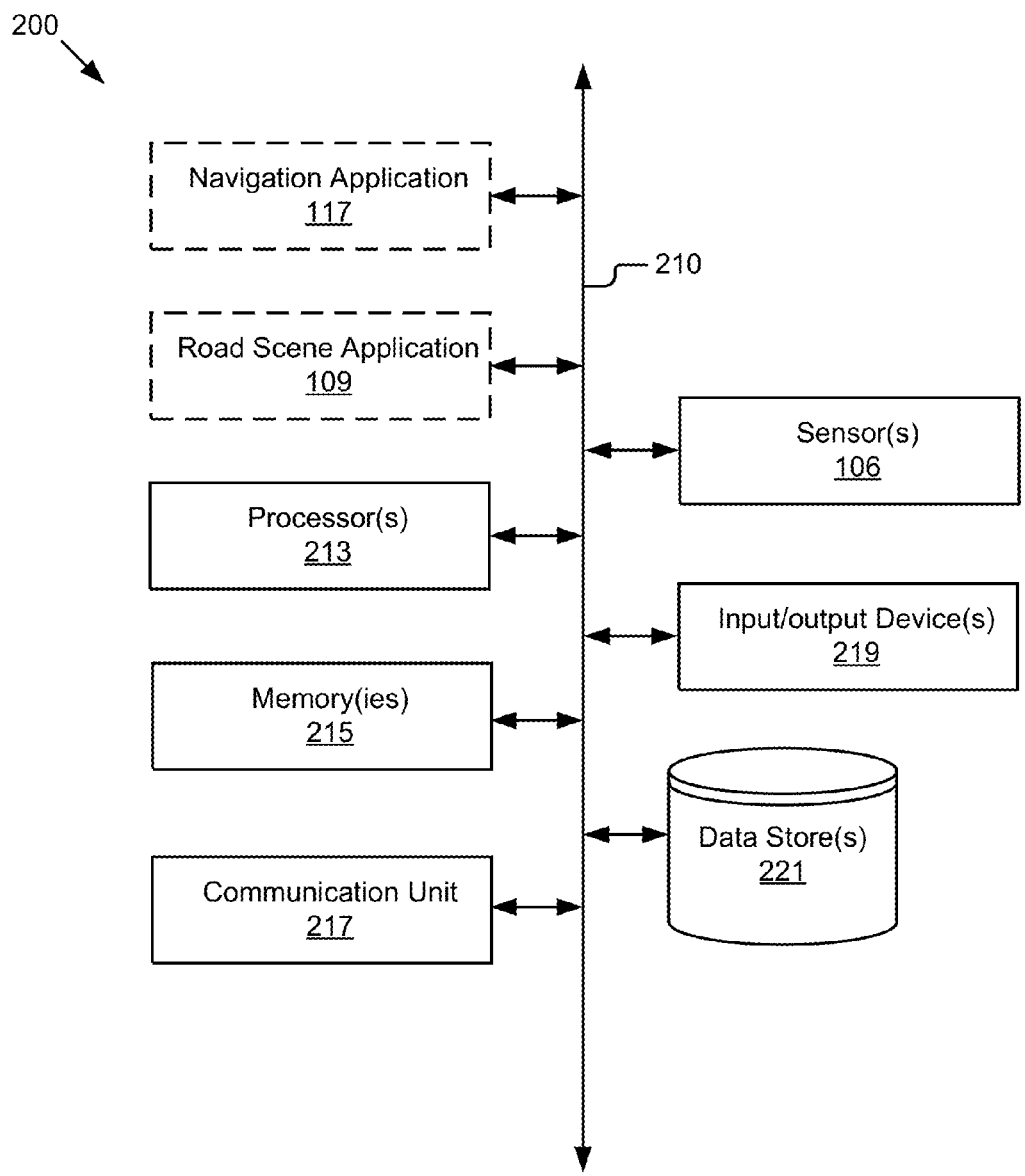
FIG. 2A is a block diagram of an example computing device.

FIG. 2A is a block diagram of a computing device 200, which may represent the architecture of a server 101, a client device 115, a moving platform 135, a map server 170, or an infrastructure server 190.

As depicted, the computing device 200 includes one or more processor(s) 213, one or more memory(ies) 215, a communication unit 217, one or more sensors 106, one or more input and/or output devices 219, and one or more data stores 221. The components of the computing device 200 are communicatively coupled by a bus 210. In implementations where the computing device 200 represents the server 101, the client device 115, or the moving platform 135, the computing device 200 may include the navigation application 117 and/or the road scene application. Further, in implementations where the computing device 200 represents a server 101, the map server 170, and/or the infrastructure server 190, the computing device 200 may include corresponding data repositories 221, such as the situation ontology 103, the POI database 172, the map database 174, the V2V data store 192, and/or the V2I/I2V data store 194.

The computing device 200 depicted in FIG. 2A is provided by way of example and it should be understood that they may take other forms and include additional or fewer components without departing from the scope of the present disclosure. For example, while not shown, the computing device 200 may include various operating systems, software, hardware components, and other physical configurations.

In embodiments where the computing device 200 is included or incorporated in the moving platform 135, the computing device 200 may include and/or be coupled to various platform components of the moving platform 135, such as a platform bus (e.g., CAN), one or more sensors (e.g., one or more control units (e.g., ECU, ECM, PCM, etc.), automotive sensors, acoustic sensors, chemical sensors, biometric sensors, positional sensors (e.g., GPS, compass, accelerometer, gyroscope, etc.), switches, and controllers, cameras, etc.) an engine, drive train, suspension components, instrumentation, climate control, and/or any other electrical, mechanical, structural, and mechanical components that are necessary.

The processor(s) 213 may execute software instructions by performing various input/output, logical, and/or mathematical operations. The processor(s) 213 may have various computing architectures to process data signals including, for example, a complex instruction set computer (CISC) architecture, a reduced instruction set computer (RISC) architecture, and/or an architecture implementing a combination of instruction sets. The processor(s) 213 may be physical and/or virtual, and may include a single core or plurality of processing units and/or cores. In some implementations, the processor(s) 213 may be capable of generating and providing electronic display signals to a display device (not shown), supporting the display of images, capturing and transmitting images, performing complex tasks including various types of feature extraction and sampling, etc. In some implementations, the processor(s) 213 may be coupled to the memory(ies) 215 via the bus 210 to access data and instructions therefrom and store data therein. The bus 210 may couple the processor(s) 213 to the other components of the computing device 200 including, for example, the memory(ies) 215, the communication unit 217, the sensor(s) 106, the input/output device(s) 219, and/or and the data store(s) 221.

The memory(ies) 215 may store and provide access to data to the other components of the computing device 200. In some implementations, the memory(ies) 215 may store instructions and/or data that may be executed by the processor(s) 213. For example, depending on the computing device 200 configuration, the memory(ies) 215 may store one or more of one or more the application(s) 117 and/or 109. The memory(ies) 215 are also capable of storing other instructions and data, including, for example, the various data described herein, an operating system, hardware drivers, other software applications, databases, etc. The memory(ies) 215 may be coupled to the bus 210 for communication with the processor(s) 213 and the other components of computing device 200.

The memory(ies) 215 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 213. In some implementations, the memory(ies) 215 may include one or more of volatile memory and non-volatile memory. For example, the memory(ies) 215 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 215 may be a single device or may include multiple types of devices and configurations.

The communication unit 217 transmits data to and receives data from other computing devices to which it is communicatively coupled (e.g., via the network 105) using wireless and/or wired connections. The communication unit 217 may include one or more wired interfaces and/or wireless transceivers for sending and receiving data. The communication unit 217 may couple to the network 105 and communicate with other computing nodes, such as client device(s) 115, moving platform(s) 135 and/or server(s) 101, etc. (depending on the configuration). The communication unit 217 may exchange data with other computing nodes using standard communication methods, such as those discussed above.

The data store(s) 221 include a non-transitory storage medium that stores data. Non-limiting example non-transitory storage medium may include a dynamic random access memory (DRAM) device, a static random access memory (SRAM) device, flash memory, a hard disk drive, a floppy disk drive, a disk-based memory device (e.g., CD, DVD, Blu-Ray™, etc.), a flash memory device, or some other known, tangible, volatile or non-volatile storage device. Depending on the computing device reflected by FIG. 2A, the data store(s) may represent one or more of the situation ontology data store 103, the vehicle CAN data store 107, the road scene data store 108, the POI database 172, the map database 174, the V2V data store 192, and/or the V2I/I2V data store 194.

The data store(s) 221 may be included in the computing device 200 or in another computing device and/or storage system distinct from but coupled to or accessible by the computing device 200. In some embodiments, the data store(s) 221 may store data in association with a database management system (DBMS) operable by the server 101, the map server 170, the infrastructure server 190, the moving platform 135 and/or the client device 115. For example, the DBMS could include a structured query language (SQL) DBMS, a NoSQL DMBS, etc. In some instances, the DBMS may store data in multi-dimensional tables comprised of rows and columns, and manipulate, i.e., insert, query, update and/or delete, rows of data using programmatic operations.

Input/output (I/O) devices 219 include any standard devices for inputting and/or outputting information. Non-limiting example IO deices 219 may include a screen (e.g., LED-based display) for displaying road scene information to the user 125; an audio reproduction device (e.g., speaker) for outputting sound information to the user 125; a microphone for capturing sound and/or voice commands, a keyboard, a touch screen, a pointing device, indicators, and/and any other I/O components for facilitating communication and/or interaction with the user 125. Input/output devices 219 can be coupled to the computing device 200 either directly or through intervening I/O controllers.

The road scene application 109 may receive road scene data (e.g., from the data store 221 and/or the sensors 106), and process the road scene data to extract various types of scene information. For example, the road scene application 109 may determine scene information including, but not limited to, locality, lighting condition, weather condition, scene compositions (e.g., dynamic road objects, static road objects), scene-level context, etc., based on the image data. As a further non-limiting example, the road scene application 109 may receive image data from one or more light and/or radar sensors (e.g., one or more cameras), and process the image data to extract various types of road scene information associated with a particular road segment.

In some embodiments, the road scene application 109 can efficiently determine one or more aspects of the road scene situation, for example, using the scene information extracted from the road scene data and vehicle operation data received from the moving platform 135. These aspects may include, but are not limited to a road surface condition of a given road segment, lane-level activity information associated with each lane of the road segment, lane-level spatial layout associated with each lane of the road segment, the weather associated with the road segment, the lighting associated with the road segment, etc.

The road scene application 109 may apply situation ontology data to generate a semantic road scene description, which summarizes a road scene situation of the road segment, as described further elsewhere herein. The semantic road scene description may be transmitted to other moving platform 135s associated with the road segment, for example, moving platform 135s proximate the road segment (e.g., moving platform 135s approaching the road segment, moving platform 135s travelling within a predetermined distance ahead or behind the current moving platform 135).

Figure 2B:
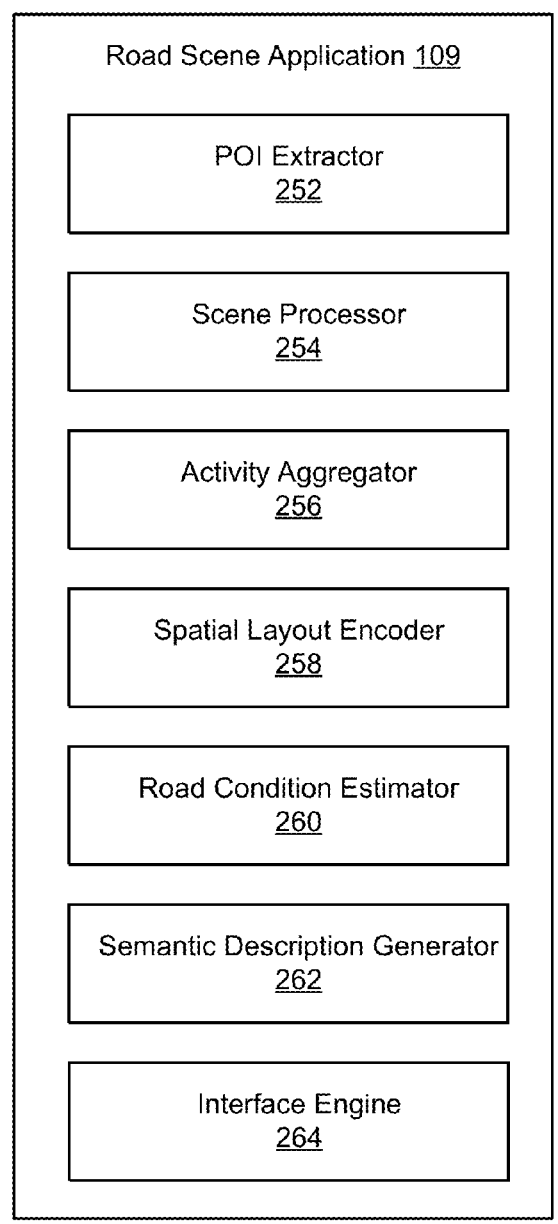
FIG. 2B is a block diagram of an example road scene application.

As shown in FIG. 2B, which depicts a block diagram of an example road scene application 109, the road scene application 109 may include a POI extractor 252, a scene processor 254, an activity aggregator 256, a spatial layout encoder 258, a road condition estimator 260, a semantic description generator 262, and an interface engine 264, although it should be understood that the road scene application 109 may include additional components such as, but not limited to, a configuration engine, a training engine, an encryption engine, etc., and/or these various components may be combined into a single engine or divided into additional engines.

The POI extractor 252, the scene processor 254, the activity aggregator 256, the spatial layout encoder 258, the road condition estimator 260, the semantic description generator 262 and/or the interface engine 264 may be implemented as software, hardware, or a combination of the foregoing. In some implementations, POI extractor 252, the scene processor 254, the activity aggregator 256, the spatial layout encoder 258, the road condition estimator 260, the semantic description generator 262 and/or the interface engine 264 may be communicatively coupled by the bus 210 and/or the processor 213 to one another and/or the other components of the computing device 200. In some implementations, one or more of the components 109, 252, 254, 256, 258, 260, 262, and/or 264 are sets of instructions executable by the processor 213 to provide their functionality. In further implementations, one or more of the components 109, 252, 254, 256, 258, 260, 262, and/or 264 are storable in the memory 215 and are accessible and executable by the processor 213 to provide their functionality. In any of the foregoing implementations, these components 109, 252, 254, 256, 258, 260, 262, and/or 264 may be adapted for cooperation and communication with the processor 213 and other components of the computing device 200.

The POI extractor 252 may be coupled to the memory 215, the communication unit 217, the data store(s) 221, and/or other components to receive map data and may extract one or more points of interest (POI) and/or landmarks associated with the road segment from the map data. In some embodiments, the POI extractor 252 may receive geo-location data (e.g., GPS coordinates) associated with current location of the moving platform 135, for example, from a transceiver (e.g., GPS device), a positioning system, and/or the vehicle CAN data store 107. The POI extractor 252 may then determine one or more points of interest and/or landmarks near the current location of the moving platform 135 by searching the POI database 172 and/or the map database 174 using the geo-location data.

As an example, assuming that a vehicle is driving on the freeway I-15, and its GPS coordinates as detected by the GPS device are 40.5829° N, 111.8932° W, the POI extractor 252 can search the POI database 172 for point of interests and/or landmarks within a predetermined proximity range (e.g., 2 miles) using the coordinates. In this example, the POI extractor 252 may determine that the vehicle is travelling within proximity of Rio Tinto stadium and Jordan Commons Megaplex Theatres. In some embodiments, the POI and landmarks extracted can be helpful in identifying which road segment is referred to in the semantic road scene description. The POI and landmarks can also be helpful in aligning multiple semantic road scene descriptions received from different vehicles associated with the same road segment, as discussed further elsewhere herein.

The scene processor 254 may be communicatively coupled to the sensors 106 (e.g., the bus 210 and/or the processor 213) and/or the data store 221 to receive sensor data, and may process the sensor data to extract various types of scene information. For example, the sensors 106 may be installed in the moving platform 135 and capture road scene data describing an environment surrounding the moving platform 135.

In some embodiments, the sensors 106 may capture image data. The image data may include images captured at a certain rate/interval (e.g., every 0.5 s, 1 s, 3 s, etc.) as the moving platform 135 travels along the road. In some embodiments, the capturing interval may vary depending on particular time of the day and/or scene-level context. For example, the image sensors 106 may capture the outside scene more frequently (e.g., every 0.2 s) during peak hours, for example, 8 am to 10 am and 5 pm to 7 pm on weekdays. In some embodiments, the image sensors 106 may adjust the capturing interval based on the scene-level context determined by the road scene application 109. For example, the image sensors 106 may capture the outside scene every 0.2 s when heavy traffic and/or congestion occurs. In further embodiments, the capture rate/interval may be a standard frame rate.

Figure 7:
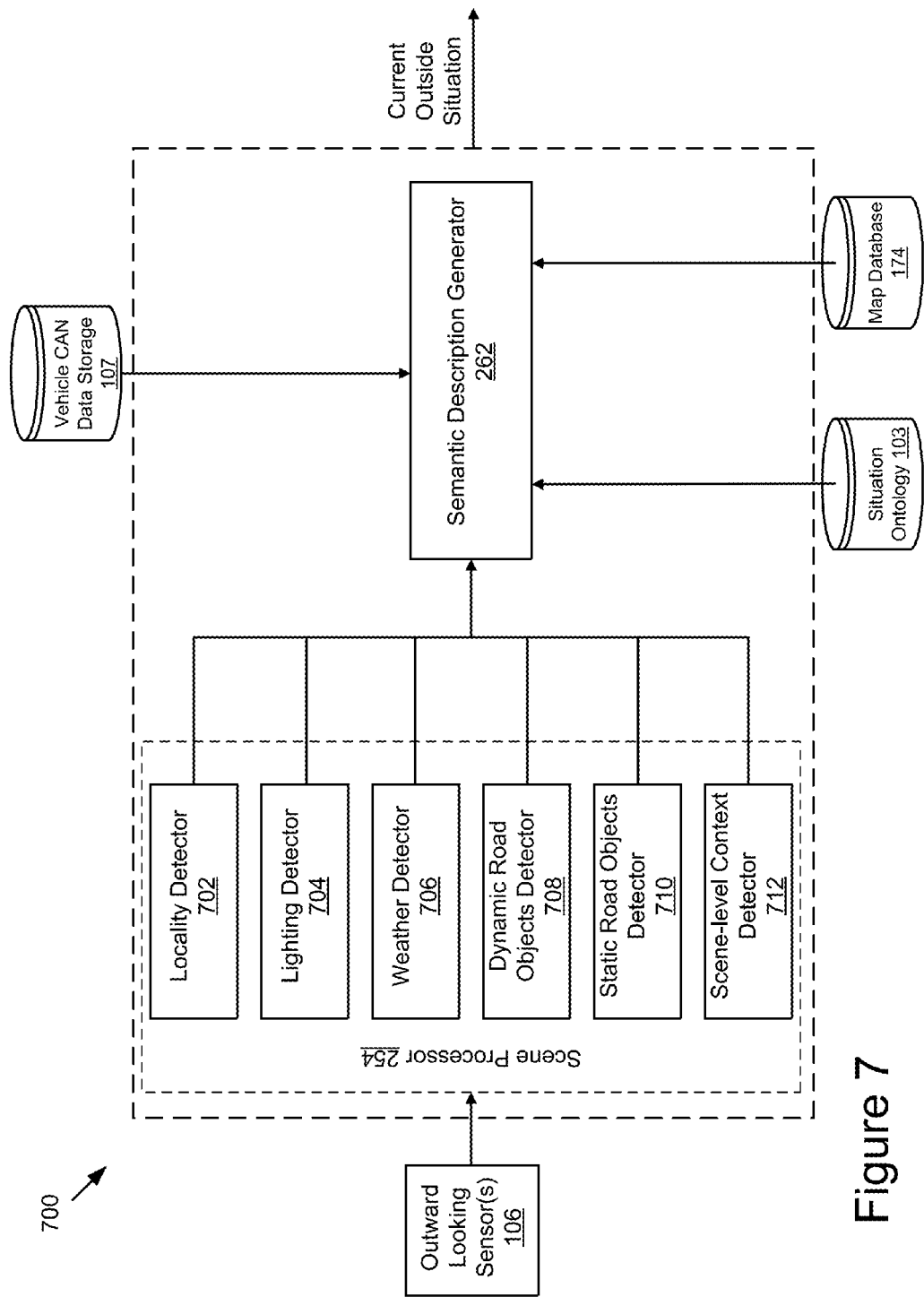
FIG. 7 is a block diagram of an example system for processing a road scene associated with a road segment.

In some embodiments, the scene processor 254 may include one or more components for processing the road scene data to determine one or more scene information. As illustrated in FIG. 7, an example scene processor 254 for processing a road scene may include a locality detector 702, a lighting detector 704, a weather detector 706, a dynamic road objects detector 708, a static road objects detector 710 and a scene-level context detector 712.

In some embodiments, the scene processor 254 may extract one or more scene parameters from the road scene data (e.g., image sensor data, etc.) using a vision algorithm. For example, the locality detector 702 may identify the type of location associated with the moving platform 135 based on what is depicted in the images. For example, if the images captured by the sensors 106 describe high buildings, crowded streets and busy crosswalks, the locality detector 702 may identify the locality of the moving platform 135 as urban area. Example categories of locality include, but are not limited to, urban area, rural area, highway, crosswalk, gas station, forest road, plaza, market, etc.

In some embodiments, the lighting detector 704 may process the input image data to estimate the illumination level of the current scene as perceived by the moving platform 135 with which it is associated. Examples of lighting condition include, but are not limited to, daytime, nighttime, normal, bright, low, dark, diffused, glare, etc.

In some embodiments, the weather detector 706 may determine a current weather condition as observed from perspective of the moving platform 135 with which it is associated by processing road scene data and/or vehicle operation data (e.g., time data, temperature data, barometer data, light data, outdoor moisture data, wiper data, and/or image data, etc.). For example, in some instances, the weather detector 706 may analyze the image data to determine outdoor light characteristics, cloudiness of the sky relative to the time of day, temperature and pressure trends to determine a change in the weather, determining the use of wipers (on vs. off, slow vs. fast), to determine an amount of precipitation, etc. For example, the weather detector 706 may determine that it is raining heavily based on the outside scene depicted in the images and the operation of windshield wipers. Examples of weather conditions include, but are not limited to, sunny, snowy, raining, raining heavily, cloudy, partial cloudy, foggy, etc. In some embodiments, the weather condition and other scene parameters may also be determined based on vehicle operation data of the moving platform 135 in addition to the road scene data.

In some embodiments, the dynamic road objects detector 708 may detect one or more dynamic road objects as observed from perspective of the moving platform 135 with which it is associated. For example, the dynamic road objects detector 708 may detect one or more vehicles, pedestrians, road workers, etc. in the field of view of the optical sensors 106. For example, the dynamic road objects detector 708 may detect an object in an image using vision algorithm and keep track of this detected object. If relative position of this detected object to a point of reference dynamically changes across subsequent images and/or frames, the dynamic road objects detector 708 may determine that the detected object is a dynamic road object. In some embodiments, the dynamic road objects detector 708 may assign a unique object identifier (e.g., an object ID) to each dynamic road object. The object IDs can be helpful in monitoring activities and positions of the dynamic road objects on the road segment.

In some embodiments, object IDs assigned to dynamic road objects may be locally unique to the moving platform 135. As an example, assuming that vehicle A assigns a first set of object IDs to dynamic road objects it identifies and vehicle B assigns a second set of object IDs to dynamic road objects it identifies. Although object IDs in the first set and the second set may be locally unique to vehicle A and vehicle B respectively, one or more object IDs assigned by vehicle A in the first set may randomly be the same as the object IDs assigned by vehicle B in the second set. In some embodiments, the object IDs may be universally unique, meaning that each object ID can uniquely identify a dynamic road object present in the scene and different moving platforms 135 can therefore use the same object ID to refer to the same dynamic road object.

In some embodiments, the static road objects detector 710 may detect one or more static road objects as observed from perspective of the moving platform 135 with which it is associated. Example static road objects include, but are not limited to, traffic signs, traffic lights, road markings, constructions cones, barricades, etc. For example, the static road objects detector 710 may detect an object in an image using a standard object detection algorithm and keep track of this object once detected. If the position of this detected object relative to a point of reference does not change in subsequent images and/or frames, the static road objects detector 710 determines that the detected object is a static road object. In scenarios where the road structure is complicated (e.g., multi-lane highways, complex intersections, etc.), the static road objects detector 710 may identify static road objects such as road markings (e.g., lane boundaries), traffic signs, etc. based on the road scene data and map data associated with the road segment. For example, the static road objects detector 710 may reference map data to identify lane line extension through an intersection.

In some embodiments, the static road objects can be helpful in determining the scene-level context. For example, the static road objects detector 710 may determine that there are a road construction sign at the right curb and traffic cones in the middle of an intersection, and the scene-level context detector 712 may determine the scene-level context of the road scene situation to be road construction. In another example, the static road objects detector 710 may determine that there are barricades and an arrow panel blocking the roadway, and the scene-level context detector 712 may determine the scene-level context of the road segment as lane closure.

Figure 12A:
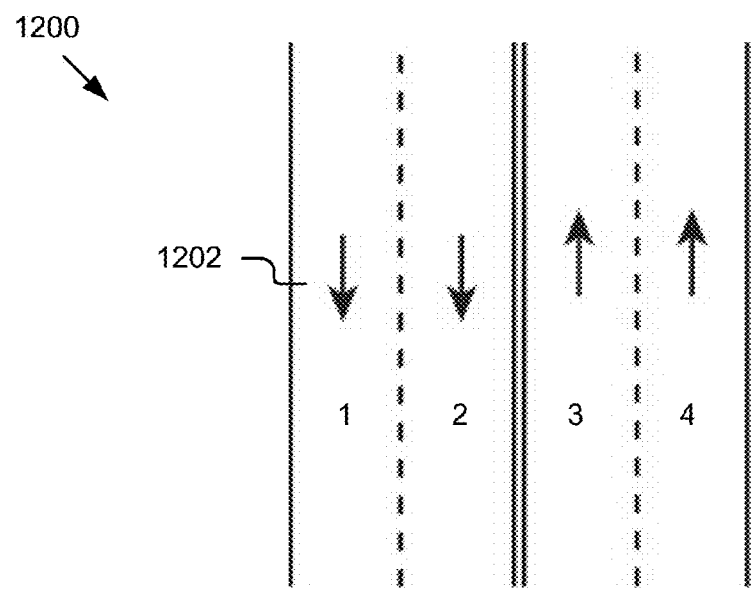
FIG. 12A illustrates an example of a lane structure associated with a road segment.

In some embodiments, the static road objects can be helpful in determining lane structure, which describes one or more lanes of the road segment. An example of lane structure associated with a road segment is illustrated in FIG. 12A. As shown, assuming that the static road objects detector 710 detects (from left to right) a solid white line, a broken white line, a double yellow line, a broken white line, and a solid white line on the road surface. Based on these static road objects, the scene processor 254 may determine that the road segment is a four-lane, two-way street with two traffic lanes in each direction. In some embodiments, the scene processor 254 may assign lane number to each lane. For example, the four lanes may be numbered in an increasing order from left side to right side of the roadway, with the leftmost lane is considered lane 1, as depicted in FIG. 12A. Other examples of lane numbering are possible. In further examples, the number of lanes on a road segment may be determined from map data, and the scene processor 254 may determine which lane the moving platform 135 is located in based on the detected static road objects (e.g., the lines visible from the moving platform 135).

In some embodiments, the scene-level context detector 712 may determine a scene-level context as observed from perspective of the moving platform 135 by processing the road scene data and/or vehicle operation data. Examples of scene-level contexts include, but are not limited to, traffic congestion, road construction, ease-of-drive metric, available road area for traversal etc. In some embodiments, the scene-level context may also be determined based on activity information and/or spatial layout associated with each lane of the road segment as described further herein, or may be determined from map data and a geo-location of the moving platform 135. In further examples, the scene-level context detector 712 may process road scene data to determine objects within the scene, and determine context based on the objects.

For example, if the images captured by a camera describe construction vehicles and traffic cones on the right side of the road, the scene-level context detector 712 may identify the scene-level context of the road segment as road construction. In another example, if the images depict little or no space between several moving platforms 135 surrounding a given moving platform 135, and each of those moving platforms 135 include red areas indicating their brake lights are on, the scene-level context detector 712 may identify the scene-level context of the road segment as traffic congestion with a low ease-of-drive metric. Numerous other variations are also possible and contemplated.

Each of the components 702, 704, 706, 708, 710, and/or 712 may store the data received and/or processed by it in the road scene data store 108 for access and/or retrieval by the semantic description generator 262.

Returning to FIG. 2B, in some embodiments, the scene processor 254 may extract the lane structure associated with the road segment from the map data associated with the road segment. For example, the map data may indicate that the freeway Interstate 15 (I-15) has five lanes in each direction on the road segment near downtown Salt Lake City. In some embodiments, the scene processor 254 may determine the lane structure based on the map data and the static road objects. For example, FIG. 12B demonstrates an example lane structure associated with two road segments 1252 and 1254 of a freeway. In this example, assuming that the map data describes the freeway as having four lanes. Based on the map data and the detected static road objects (e.g., a road marking indicating a gore area), the scene processor 254 can determine that the road segment 1252 has four lanes and the road segment 1254 has four lanes divided by divider 1256.

In some embodiments, the scene processor 254 may generate lane information describing the lane structure of the road segment. In some embodiments, the lane information may include lane number and lane type. For example, the lane information may indicate that on the freeway I-15, lane 1 is a carpool lane, lane 2 is a passing lane, lanes 3 and 4 are driving lanes, and lane 5 is an emergency lane. In some embodiments, the lane information may also include lane width, lane capacity (e.g., number of heavy vehicles), lane status (e.g., lane construction, lane closure, etc.), other lane characteristics, etc.

In some embodiments, the scene processor 254 sends multiple road scene parameters (e.g., locality, lighting condition, weather condition, static road objects, dynamic road objects, lane information, scene-level context, etc.) determined from the image data and/or map data to other components of the road scene application 109, including the semantic description generator 262, and/or stores the parameters in a data store 221 for access and/or retrieval by these or other components. As illustrated in FIG. 7, the semantic description generator 262 may generate a semantic description for the current outside situation based on the road scene parameters, the vehicle operation data, and the situation ontology data. In some embodiments, the map data may be used in generating the semantic road scene description, as discussed further elsewhere herein.

The activity aggregator 256 may be coupled to the scene processor 254, the memory 215, the communication unit 217, the data store(s) 221, and/or other components, to receive data describing scene compositions (e.g., dynamic road objects, static road objects, lane information, etc.), and may aggregate information describing activities of various road objects to generate lane-level activity information. In some embodiments, the lane-level activity information describes activities of one or more dynamic road objects in each lane of the road segment. In some embodiments, the activity aggregator 256 may perform spatio-temporal tracking on road objects present in the scene and determine lane-level activities based on the spatio-temporal tracking information.

In some embodiments, the activity aggregator 256 may detect lane position of the moving platform 135 and one or more dynamic objects. For example, the activity aggregator 256 may use the detected static road objects, the lane information and/or the map data to localize the moving platforms and other surrounding moving platforms 135 travelling on the road segment. As an example, a first moving platform 135 is driving on the road segment 1202 depicted in FIG. 12A. The scene processor 254 identifies a broken white line on the right side and a double yellow line on the left side of the first moving platform 135. The activity aggregator 256 may apply lane information (e.g., lane number) of the road segment 1202 and thus determine that the first moving platform 135 is driving in lane 3, and other moving platforms 135 in the neighboring left lane and neighboring right lane are driving in lane 2 and lane 4 of the road segment, respectively.

Figure 12B:
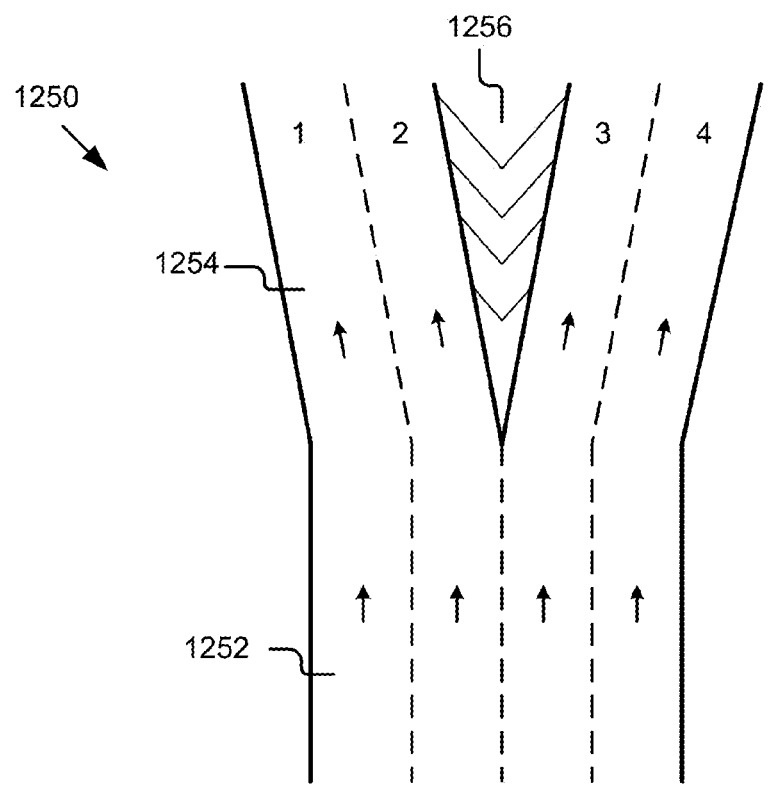
FIG. 12B illustrates another example of lane structure associated with a road segment.

As another example, a moving platform 135 is driving on the road segment 1252 depicted in FIG. 12B. The scene processor 254 identifies a solid white line on the right side and a broken white line on the left side of the moving platform 135. The activity aggregator 256 may thus determine that the moving platform 135 is driving in the rightmost lane of the freeway. The activity aggregator 256 may reference the map data and determines that the freeway has four lanes. The activity aggregator 256 may therefore determine that the moving platform 135 is travelling in lane 4 of the freeway and other moving platforms 135 in the neighboring left lane are travelling in lane 3 of the freeway.

In some embodiments, the activity aggregator 256 may estimate lane position of a dynamic road object based on its relative distance to the moving platform 135 with which it is associated. For example, the image data captured by the sensors 106 of a first moving platform 135 describes a second moving platform 135 travelling parallel to the first moving platform 135 at an approximate distance of a lane width to the left of the first moving platform 135. If the first moving platform 135 is travelling in lane 4, the activity aggregator 256 may determine that the second moving platform 135 is travelling in lane 2 of the freeway.

As a further example, a moving platform 135 is driving on the road segment 1254 depicted in FIG. 12B. In this example, assuming that the map data describes the road segment 1254 as having four lanes and a divider 1256 between lane 2 and lane 3. The scene processor 254 detects divider/gore markings on the right side and a broken white line on the left side of the first moving platform 135. The scene processor 254 references the map data and determines that the moving platform 135 is travelling in lane 2 of the freeway. Other moving platforms 135 in the neighboring left lane of the first moving platform 135 are driving in lane 1. Advantageously, the map data can assist in localizing the first moving platform 135 and dynamic road objects in case the road structure is complicated (e.g., multi-lane highways, complex intersections, etc.). Complicated road structure(s) can make it difficult to determine lane position based solely on the static road objects detected from perspective of the moving platform 135.

In some embodiments, the activity aggregator 256 may spatially and temporally monitor lane position of the dynamic road objects to extract activities performed by dynamic road objects. In some embodiments, the activity aggregator 256 may monitor the dynamic road objects based on their object IDs assigned by the dynamic road objects detector 708. In some embodiments, the activity aggregator 256 may also monitor lane position of a first vehicle itself.

As a further example, at time t=t0, the activity aggregator 256 determines that vehicle 1 (its own vehicle) is driving in lane 4 of the road segment 1254, two vehicles having object IDs=10 and 11 (e.g., vehicle 10 and vehicle 11) are also driving in lane 4, and two vehicles having object IDs=12 and 13 (e.g., vehicle 12 and vehicle 13) are driving in lane 3. At time t=t1 (e.g., a certain amount of time later) (e.g., 0.5 s), the scene processor 254 processes newly received road scene data and determines that vehicle 1 (its own vehicle) is still driving in lane 4. Vehicle 10, vehicle 13, and a new vehicle having object ID=14 (e.g., vehicle 14), are now driving in lane 4, while vehicle 12 is still driving in lane 3. In this scenario, the activity aggregator 256 determines that vehicle 1, vehicle 10, and vehicle 12 are still in their previous lanes, vehicle 11 has left the freeway, vehicle 13 has changed from lane 3 to lane 4, and vehicle 14 is a new vehicle that has just entered lane 4. By monitoring the lane position of the dynamic road objects and vehicle 1, not only in space but also in time, the activity aggregator 256 can extract activities of dynamic road objects surrounding the first vehicle and stay up-to-date on current positions and activities of these dynamic road objects. In a further example, the activity aggregator 256 may determine that vehicle 13 is splashing water and vehicle 14 has collided based on the road scene data.

In some embodiments, the activity aggregator 256 may spatially and temporally monitor movement of the dynamic road objects to extract activities performed by these dynamic road objects. In some embodiments, the activity aggregator 256 may monitor relative speed of the one or more dynamic road objects, for example, based on road scene data and vehicle operation data of the moving platform 135 with which the activity aggregator 256 is associated.

In some cases, the activity aggregator 256 may identify a dynamic road object in a captured image and may monitor the dynamic road object across multiple subsequent images in space and in time. The activity aggregator 256 may then apply speed estimation algorithm (e.g., optical flow computation) to estimate the relative velocity of the dynamic road object. The relative velocity of the dynamic road object may be estimated based on relative motion between the dynamic road object extracted from the road scene data and the moving platform 135. For example, in the above scenario, the activity aggregator 256 may determine that vehicle 10 is travelling at similar speed as vehicle 1 because the road scene data indicates that relative position of vehicle 10 to vehicle 1 has not changed across multiple frames. The activity aggregator 256 may then determine then that vehicle 10 is driving at about 55 mph, as identified by vehicle operation data (e.g. speedometer output) of vehicle 1.

In some embodiments, the activity aggregator 256 can determine activities of the dynamic road objects based on the identified relative speed of a particular dynamic road object. For example, the activity aggregator 256 can determine whether a particular dynamic road object is moving at a constant speed, speeding up (e.g., accelerating), slowing down (e.g., decelerating) or has stopped. The activity aggregator 256 can also determine whether the dynamic road object is moving slow or fast, whether or not that particular dynamic road object exceeds speed limit associated with the road segment, etc. based on its monitored movement. For example, the activity aggregator 256 may determine that a car at the right curb is a parked vehicle because it is not moving, e.g., its relative speed equals to zero.

In some embodiments, the activity aggregator 256 may aggregate activities of multiple dynamic road objects to generate lane-level activity information for each lane of the road segment. In some embodiments, the lane-level activity information describes activities of one or more vehicles in each lane at the lane level. For example, the activity aggregator 256 may determine that multiple vehicles in lane 2 are moving at a constant average speed close to the speed limit and thus identify a smooth traffic flow in lane 2. As another example, the activity aggregator 256 may determine that vehicle 14 in lane 4 has crashed and other vehicles behind vehicle 14 are not moving. The activity aggregator 256 may then generate lane-level activity information for lane 4 which describes vehicle 14 has collided and cars in lane 4 have stopped. The activity information associated with each lane of the road segment can be of great value to other vehicles, for example, vehicles approaching the road segment from behind.

In order to facilitate the spatio-temporal tracking of dynamic road objects in the scene, each dynamic road object may be assigned a unique object ID along with object identification features (e.g., color, model, shape, license plate, etc.). For example, in the scenario described above, the object ID (e.g., vehicle 13) makes it clear to the activity aggregator 256 that vehicle 13 in lane 4 at the time t=t1 is the same as vehicle 13 in lane 3 at the time t=t0. The activity aggregator 256 therefore can determine that vehicle 13 has changed from lane 3 to lane 4, without being confused that vehicle 13 is a new vehicle recently appeared in the scene. In some embodiments, the object IDs corresponding to the dynamic road objects may be included in the semantic road scene description, which is send to other vehicles and/or infrastructure server(s) 190 and/or the server(s) 101. This is advantageous as the object IDs allow receiving entities (e.g., the other moving platforms 135, infrastructure server(s) 190, the server(s) 101, etc.) to resolve the data and avoid duplicates when aggregating lane-level activity information related to the same dynamic road object. For example, lane-level activity information received from vehicle A indicates that vehicle 13 has changed from lane 3 to lane 4 and lane-level activity information received from vehicle B indicates that vehicle 13 is splashing water. Based on the object ID (e.g., object ID=13), the infrastructure server 190 and/or the server 101 and/or the receiving vehicle may aggregate the lane-level activity information received from vehicle A and vehicle B and may come to a conclusion that vehicle 13 has changed from lane 3 to lane 4 and vehicle 13 is splashing water.

As described above with reference to the dynamic road objects detector 708, the object ID associated with a particular dynamic road object may be universally unique or locally unique to each moving platform 135. In the above example, the object ID is universally unique, and thus vehicle A and vehicle B can use the same object ID (e.g., object ID=13) to refer to the same dynamic road object (e.g., the same vehicle 13). However, even in the embodiments where the object ID is only locally unique to the vehicle where it originated (e.g., a first vehicle), the object ID can still be advantageous. In particular, the object ID can still be used to aggregate lane-level activity information received from the same sending entity at different points in time. For example, lane-level activity information received from vehicle A at the time t=t1 indicates that vehicle 14 has collided and lane-level activity information received from vehicle A at the time t=t2 indicates that vehicle 14 has moved to emergency lane. Based on the object ID (e.g., object ID=14), the infrastructure server 190 and/or the server 101 and/or the receiving vehicle may aggregate the lane-level activity information received from vehicle A at the time t1 and t2 to discern the current situation on the road segment. In this example, although a vehicle C may assign a different object ID to vehicle 14, the object ID 14 is still unique to the infrastructure server 190 and/or the server 101 and/or the receiving vehicle as seen from perspective of vehicle A. Therefore, the object ID 14 can advantageously be used to process activity information related to vehicle 14 that is received from vehicle A. In some embodiments, the object IDs corresponding to the dynamic road objects may be encrypted and included in the semantic road scene description. In some further embodiments, the object IDs may omitted from the semantic road scene description.

The spatial layout encoder 258 may be coupled to the scene processor 254, the activity aggregator 256, the memory 215, the communication unit 217, the data store(s) 221, and/or other components to receive data describing scene compositions (e.g., dynamic road objects, static road objects, lane information, lane position etc.), and may encode a lane-level spatial layout for each lane of the road segment. In some embodiments, the lane-level spatial layout describing object-to-object relationships between dynamic road objects in a particular lane. For example, the lane-level spatial layout may indicate average distance between two moving platforms 135 driving in the lane. In some embodiments, the average distance can be spatial distance and/or temporal distance between two dynamic road objects in the lane.

In some embodiments, the spatial layout encoder 258 may determine a number of dynamic road objects in each lane of the road segment, for example, based on the road scene data captured by the sensors 106 of the vehicle. As an example, assuming that the vehicle is travelling in lane 3 of the road segment. The dynamic road objects detector 710 processes the road scene data and determines that there are a car and a truck driving ahead of the first vehicle in lane 3. The road scene data also describes that there are three cars driving in lane 2 and five cars driving in lane 4.

In some embodiments, the spatial layout encoder 258 may receive a sensor range associated with the sensors 106 of the moving platform 135. In some embodiments, the sensor range (also referred to as the visible range) of the sensors 106 specifies their field of view, e.g., the capture area of the sensors. The sensor range of the sensors 106 can be a fixed value or a dynamic value. In some embodiments, the sensor range of the camera may be manually adjusted by the user and/or automatically adjusted based on the light condition (e.g., bright, low, normal, etc.) of the current road scene. For example, the sensors 106 may cover a visible range of 15 m at night and 45 m in daylight.

In some embodiments, the spatial layout encoder 258 may determine the lane-level spatial layout for each lane, using the number of dynamic road objects detected in each lane and the sensor range of the sensors 106. In the above example, the dynamic road objects detector 710 identifies five cars in lane 4 and the sensors 106 are operating with a sensor range of 25 m. The spatial layout encoder 258 may thus determine that the lane-level spatial layout of lane 4 is five cars in 25 m. In some embodiments, the road scene application 109 may include a training engine, which monitors operation of the vehicle and traffic patterns in its driving history. For example, the training engine may determine that there are usually three cars within the sensor range of 25 m in moderate traffic conditions. The spatial layout encoder 258 may thus determine that vehicles are bunching up in lane 4 because their positions are too close to each other. The spatial layout encoder 258 may thus predict that a traffic situation is occurring ahead in lane 4.

In some embodiments, the spatial layout encoder 258 may determine the lane-level spatial layout for each lane based on the road scene data. In some embodiments, the spatial layout encoder 258 may estimate distances from the sensors 106 to a first dynamic road object and a second dynamic road object based on the road scene data. The spatial layout encoder 258 may then determine relative distance between these two dynamic road objects by computing the difference between the two estimated distances. For example, the spatial layout encoder 258 may determine that the average distance between vehicles in lane 2 is about 5 m or a following distance of about 2.3 s.

As a further example, in the above scenario, the spatial layout encoder 258 may determine that in lane 2, the relative distance between vehicle 20 and vehicle 21 is 3 s while the relative distance between vehicle 21 and vehicle 22 is 1 s. Based on this lane-level spatial layout (e.g., object-to-object relationships), the spatial layout encoder 258 may determine that traffic in lane 2 is not as busy as lane 4 (three vehicles v. five vehicles) and vehicle 22 is probably tailgating vehicle 21.

In some embodiments, the semantic description generator 262 may determine current outside condition(s) associated with the road segment based on the lane-level activity information generated by the activity aggregator 256, the lane-level spatial layout generated by the spatial layout encoder 258 and/or other road scene information. As an example, the activity aggregator 256 determines that vehicles in a particular lane are moving slowly at average speed of 25 mph while the speed limit of the road segment is 65 mph. The spatial layout encoder 258 determines that the vehicles in lane 1 are following each other closely because the relative following distance between every two vehicles is about 1 s. The lane information associated with the road segment indicates that the particular lane is a passing lane (e.g., lane 1), where vehicles should travel at speed close to the speed limit. The semantic description generator 262 may therefore determine that traffic congestion is occurring in lane 1 and include this information in the aspects describing lane 1 in the semantic road scene description. In other embodiments, the semantic description generator 262 may include multiple separate road scene parameters describing the outside scene in the semantic road scene description. In these embodiments, the determination of the outside condition(s) based on these road scene parameters may be performed by the receiving entities. This is advantageous when the receiving entities of the semantic road scene description have substantial computational resources such as the infrastructure server 190, server 101, other cloud servers, infrastructures in V2I/I2V communication networks, etc.

The road condition estimator 260 may be coupled to the scene processor 254, the memory 215, the communication unit 217, the data store(s) 221, and/or other components to receive data describing vehicle operation data (e.g., vehicle CAN data) and scene information (e.g., locality, weather condition, etc.), and may estimate the road surface condition associated with the road segment. Examples of road surface condition include, but are not limited to, normal (e.g., dry), wet, slippery, flooded, bumpy, skid, snow, splashing, etc.

As an example, the scene processor 254 may identify the current weather condition as "raining heavily" and the vehicle operation data of the first vehicle may indicate low traction between the tires and the road. The road condition estimator 260 may thus determine that the road surface condition of the road segment is "wet" or "slippery." In some embodiments, the road condition estimator 260 may use road scene data (e.g., image sensor data and other road scene information (e.g., locality attribute)) in determining the road surface condition. As a further example of this scenario, the scene processor 254 may classify the locality of the road segment as "forest road" and the road scene data may describe a brown muddy road surface. The road condition estimator 260 may thus determine that the road surface condition of the road segment is "mud splashing."

The semantic description generator 262 may be coupled to the POI extractor 252, the scene processor 254, the activity aggregator 256, the spatial layout encoder 258, the road condition estimator 260, the memory 215, the communication unit 217, the data store(s) 221, and/or other components to receive data (road scene data, vehicle operation data, map data, situation ontology data, etc.) describing the current outside situation as perceived from perspective of vehicle moving platform 135 and may generate a semantic road scene description describing the road segment based on the data received. In particular, the semantic description generator 262 may combine the road scene parameters determined by these components of the road scene application 109 into the semantic road scene description using the situation ontology data. In some embodiments, the semantic description generator 262 may also determine one or more outside conditions of the current situation based on these received road scene parameters as described above with reference to the activity aggregator 256 and the spatial layout encoder 258, for example. The semantic description generator 262 and the semantic road scene description are described in detail with reference to at least FIGS. 8 and 9.

Figure 8:
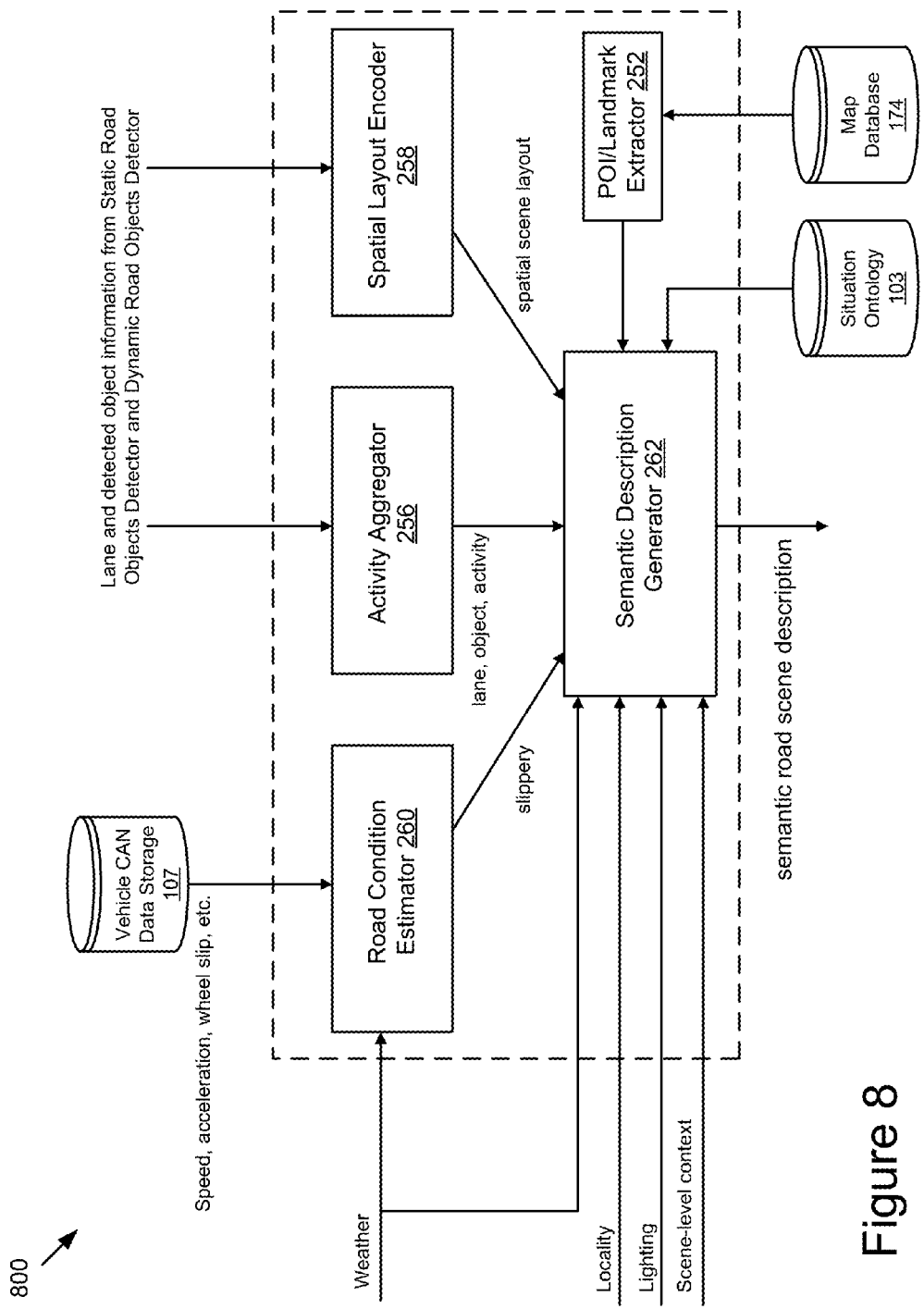
FIG. 8 is a block diagram of an example system for generating a semantic road scene description for a road segment.

FIG. 8 is a block diagram of an example system 800 for generating a semantic road scene description for a road segment. As illustrated in FIG. 8, the semantic description generator 262 may receive the weather condition, the locality, the lighting condition, the scene-level traffic context, the road surface condition, the lane-level activity information and the lane-level spatial layout from the weather detector 706, the locality detector 702, the lighting detector 704, the scene-level context detector 710, the road condition estimator 260, the activity aggregator 256 and the spatial layout encoder 258, respectively. In some embodiments, the semantic description generator 262 may also receive POI/landmark information from the POI extractor 252. In some embodiments, the semantic description generator 262 may then apply the situation ontology data stored in the situation ontology database 103 and/or stored and/or cached in local memory (e.g., memory 215 of the moving platform 135, the road scene data store 108, another data store, etc.) to generate the semantic road scene description. The semantic road scene description compile the road scene information received from these components into a representation that can then be shared with multiple vehicles and/or infrastructures. In some cases, the semantic road scene description may be compacted for efficient transmission.

In some embodiments, the semantic description generator 262 may receive the current location of the moving platform 135 and may include this current location in the semantic road scene description. The current location of the moving platform 135 can be helpful for the receiving entities of the semantic road scene description to localize where the corresponding road scene situation has occurred. For example, based on the geo-location data (e.g., GPS coordinates) in the semantic road scene description, a receiving moving platform 135 may determine that the outside situation described in the semantic road scene description has occurred 5 km behind its current position. In some embodiments, the current location of the sending moving platform 135 needs not to be an exact location but a proximate location. For example, the geo-location (e.g., GPS coordinates) identified by the GPS device may not be completely accurate. As another example, the location aspect in the semantic road scene description can be "about 200 m pass Presidents Circle, University of Utah." In this example, the receiving moving platform 135 can determine its own position, e.g., about 150 m to the Presidents Circle, and thus determine that the road scene situation described in the semantic description has occurred 350 m ahead.

In some embodiments, the semantic road scene description can be a structured data file. For example, the semantic road scene description may be generated in any form of structured data file format such as XML (Extensible Markup Language), CSV (Comma Separated Value), JSON (JavaScript Object Notation), etc. In some embodiments, the semantic road scene description may conform to a predefined template to be efficiently exchanged between different moving platforms 135, infrastructure server(s) 190, server(s) 101, infrastructure(s), etc. In some embodiments, the road scene aspects included in the predefined template may be dynamically adjusted based on the locality of the road segment. For example, a predefined template applied to the locality of "urban area" may include an aspect describing crosswalks while a predefined template used for the locality of "freeway" may not.

Figure 9:
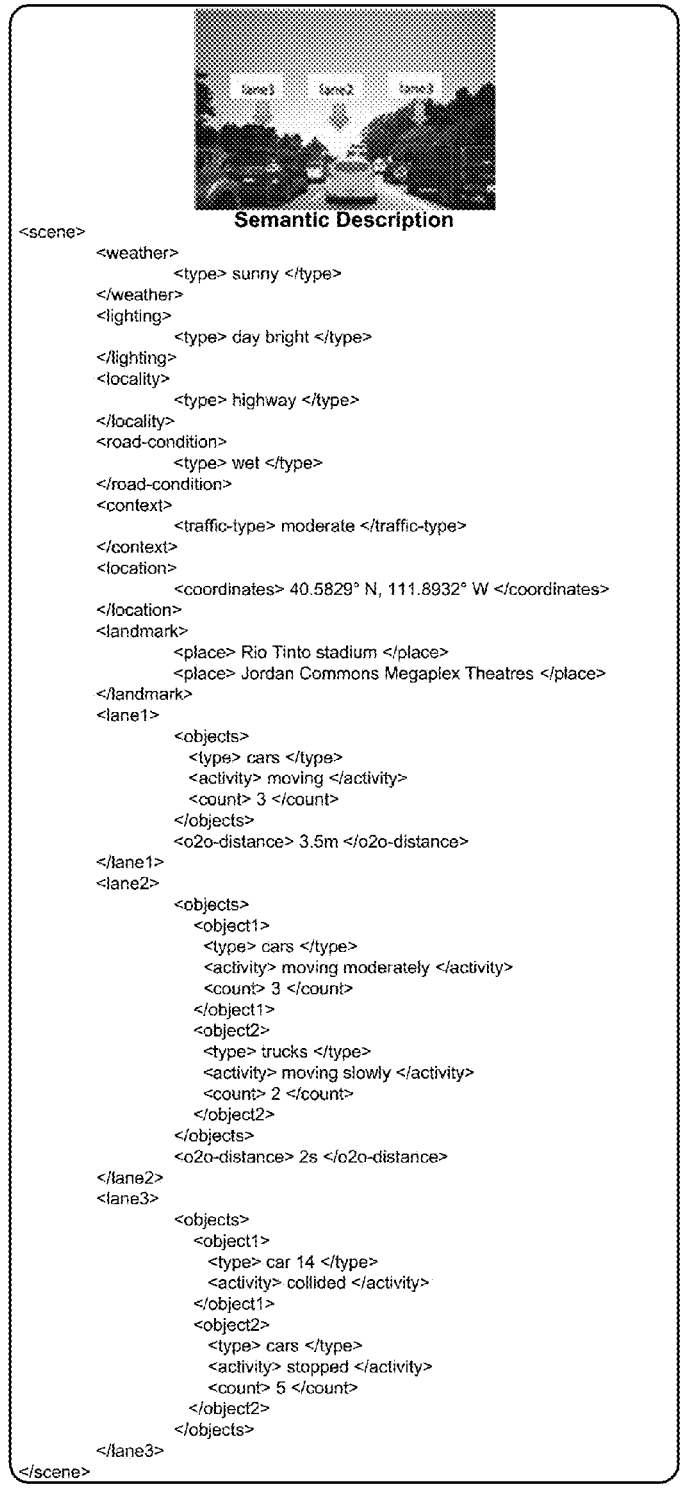
FIG. 9 depicts an example semantic road scene description.

FIG. 9 demonstrates an example semantic road scene description generated by the semantic description generator 262. As shown, the semantic description generator 262 may describe the weather condition, the lighting condition, the locality, the scene-level traffic context, and the road surface condition using corresponding terms defined by the situation ontology data. For example, as depicted in FIG. 9, the semantic road scene description 900 may include one or more of the following aspects: a weather attribute indicating the weather condition as "sunny," a lighting attribute indicating the lighting condition as "day bright," a locality attribute indicating the locality as "highway," a road-condition attribute indicating the road surface condition as "wet," and a context attribute indicating the traffic context at scene level as "moderate."

As depicted, the semantic road scene description 900 may include the current location of the first vehicle and one or more POI and/or landmarks close to the current location of the first vehicle. In particular, the semantic road scene description 900 may include a location attribute indicating the current location (e.g., GPS coordinates) of the first vehicle as "40.5829° N, 111.8932° W" and a landmark attribute indicating the nearby landmarks and POIs as "Rio Tinto stadium" and "Jordan Commons Megaplex Theatres."

As illustrated in FIG. 9, the semantic description generator 262 may include one or more aspects describing each lane of the road segment. In some embodiments, these aspects may describe lane-specific information of each lane, for example, a lane number, the lane-level activity information (e.g., attributes of one or more dynamic road objects present in the lane (object type, object ID, etc.), activities of the one or more dynamic road objects, etc.) and the lane-level spatial layout (e.g., number of dynamic road objects occupying the lane, object-to-object relationships within the lane, etc.), etc. For example, as depicted in FIG. 9, the semantic road scene description 900 may include three aspects corresponding to lane 1, lane 2 and lane 3 of the road segment. As shown, aspect "lane 1" indicates that there are three cars moving in lane 1 at a distance of 3.5 m between each other. Aspect "lane 2" describes two types of dynamic road objects occupying lane 2. In particular, there are three cars moving moderately and two trucks moving slowly in lane 2. Aspect "lane 2" also indicates that the average following distance of vehicles in lane 2 is 2 s. Aspect "lane 3" indicates that a car with object ID=14 has collided and other vehicles (e.g., five cars) in lane 3 has stopped. In some embodiments, the semantic road scene description may include other road scene aspects.

In some embodiments, the sending moving platform 135 may transmit the semantic road scene description to one or more other moving platforms 135 associated with the road segment, for example, via a V2V communication network. In some embodiments, moving platforms 135 associated with a segment may include one or more moving platforms 135 proximate to the road segment. For example, moving platforms 135 associated with a road segment may include, but are not limited to, moving platforms 135 approaching the road segment (e.g., vehicles travelling behind the first vehicle on the road segment, vehicles predicted to reach the road segment within the next 15 minutes, etc.), moving platforms 135 that have passed the road segment (e.g., vehicles travelling ahead of the first vehicle on the road segment, vehicles has passed the road segment within the last 15 minutes, etc.), moving platforms 135 travelling within a predetermined distance from a point of reference on the road segment (e.g., vehicles travelling within the radius of two miles from Rio Tinto stadium, vehicles travelling within the radius of 3 km from current location of the first vehicle, etc.), etc. In some embodiments, the sending moving platforms 135 may transmit the semantic road scene description to any other moving platforms 135 that are within its radio frequency communication range. In some embodiments, the sending moving platforms 135 may transmit the semantic road scene description to infrastructures or cloud servers via a V2I/I2V communication network. Other variations are also possible and contemplated.

In some embodiments, the receiving moving platforms 135 benefit from receiving semantic descriptions from other surrounding moving platforms 135 because they are able to determine a more accurate reflecting of the current road scene situation that they may be approaching. For example, referring to FIG. 12B, several first vehicles are driving on the road segment 1252 behind a second vehicle and communicate semantic descriptions they generate to the second vehicle, which is currently driving on lane 3 of the road segment 1254. The semantic description describes a car accident in lane 4 of the road segment 1252. Because traffic in lane 4 on the road segment 1252 cannot proceed due to the car accident, therefore there would be no vehicle approaching the road segment 1254 in lane 4. The second vehicle may then provide a navigational suggestion to its driver to shift from lane 3 to lane 4 of the road segment 1254 for faster commute.

In some embodiments, the semantic road scene description may be distributed to one or more receiving entities (e.g., other moving platforms 135, infrastructure elements, server(s) 101, client device(s) 115, etc.) in a real-time or non-real-time manner, for example, depending on capacity of the network (e.g., bandwidth limitation of the V2V communication network and/or V2I/I2V communication network). As an example, if the available bandwidth of the V2V communication network satisfies a threshold value, the first vehicle may communicate the semantic road scene description to other vehicles in real-time, e.g., when the road scene data is captured/collected from the sensor 106 and processed by the road scene application 109. In some embodiments, a moving platform 135 may transmit the semantic road scene description at a specified interval (e.g., every 4 s). In some embodiments, the generation and transmission of the semantic road scene description may be automatically performed by the road scene application 109 without user intervention.

In some embodiments, the capturing and processing of road scene data may be done (e.g., automatically) in each moving platform 135 along a particular road segment. In particular, each moving platform 135 driving on the road segment may generate a semantic description describing the current road scene situation as perceived and analyzed from its perspective.

In some embodiments, a moving platform 135 associated with a road segment may receive a plurality of semantic descriptions of the road segment from two or more other moving platform(s) 135 associated with the road segment. For example, a first vehicle driving on the road segment may transmit a semantic description it generates to one or more second vehicles approaching the road segment and may receive from two or more third vehicles have passed the road segment the semantic descriptions these third vehicles generate. This is advantageous, as each receiving vehicle may receive semantic descriptions from multiple surrounding vehicles, and may validate the current road scene situation based on more than one source. In this example, first vehicle, the one or more second vehicles, and two one or more third vehicles may be considered vehicles associated with the road segment. Other examples of vehicles associated with the road segment are described elsewhere herein.

In some embodiments, the receiving vehicles may align the two or more semantic road scene descriptions and may reconstruct the outside situation of the road segment based on what the sending vehicles see and describe in the two or more semantic descriptions. In particular, the receiving vehicle may align the two or more semantic road scene descriptions based on one or more road scene aspects included therein.

In some embodiments, the two or more semantic road scene descriptions may be aggregated using lane information. For example, a first semantic description received from a first sending vehicle describes cars in lane 1 as moving smoothly with an object-to-object distance of 3 s and a second semantic description received from a second sending vehicle describes cars and trucks in lane 1 as moving smoothly with an object-to-object distance of 2.7 s. Based on road scene aspects associated with lane 1 of the aligned semantic descriptions, the road scene application 109 of the receiving vehicles may determine that vehicles in lane 1 include cars and trucks and they are driving smoothly with a following distance of somewhere between 2.7 s and 3 s.

In some embodiments, the two or more semantic road scene descriptions may be aligned based on static road objects. For example, a first semantic description received from a first sending vehicle describes a traffic light at State St. and Washington St. intersection as a point of reference, and describes that two cars and a towing vehicle are stopping at the red light in lane 2 of Washington St. A second semantic description received from a second sending vehicle describes the same traffic light at the same intersection. The second semantic description further describes that a car and a truck are stopping at the red light in lane 4 and lane 5 of Washington St. and signaling right. Based on the static road object (e.g., the traffic light), the road scene application 109 of the receiving vehicle may align the first semantic description with the second sematic description to comprehend a more complete outside situation at the intersection. For example, the road scene application 109 of the receiving vehicle may determine that there are two cars and a towing vehicle stopping at the red light in lane 2 and there are a car in lane 4 and a truck in lane 5 which are about to take a right turn to leave Washington St.

In some embodiments, the two or more semantic road scene descriptions may be aligned based on the lane information and map data associated with the road segment. The map data may be particularly helpful for alignment purpose in case the road segment has a complex road structure. For example, in the above situation, the receiving vehicle may have to reference map data to determine that the Washington St. has five lanes and that the traffic lights referred to in the first semantic description and the second semantic description are in fact the same or to control the same traffic flow. The road scene application 109 of the receiving vehicle may then combine the first semantic description and the second semantic description using the lane information included therein. In this example, the receiving vehicle may also have to reference map data to determine that the Washington St. has two right turn lanes at this intersection and does not allow right turn on red light.

In some embodiments, the two or more semantic road scene descriptions may be aligned based on dynamic road objects. For example, if a first semantic description and a second semantic description both describe the same dynamic road object (e.g., a black car with a license plate XYZ), the road scene application 109 of the receiving vehicle may align the first semantic description with the second sematic description based on the dynamic road object to reconstruct a more complete outside road scene. In some embodiments, the object ID and/or the identification features of the dynamic road object may be represented in the semantic road scene descriptions and can thus be used to identify the dynamic road object for alignment.

In some embodiments, the alignment of multiple semantic descriptions may be performed by the server(s) 101, the infrastructure server(s) 190, and/or components of the system 100. For example, a server 101 or 190 may receive multiple semantic descriptions related to the same road segment from different first vehicles via V2I/I2V communication network. In some embodiments, the server 101 or 190 may then align the semantic descriptions received, may determine the outside conditions based on the aligned semantic descriptions, and may transmit the determined outside conditions to other vehicles associated with the road segment. In this embodiment, there can be some lag time due to the processing of semantic descriptions at the server 101 or 190.

The interface engine 264 may be coupled to the memory 215, the communication unit 217, the data store(s) 221, and/or other components to generate and provide user interfaces to users. In some embodiments, the interface engine 264 can generate graphical data for providing a user interface that presents road scene information to a user. In further embodiments, the navigation application 117 may perform these operations based on road scene information provided to it or stored by the road scene application 109.

Figure 10:
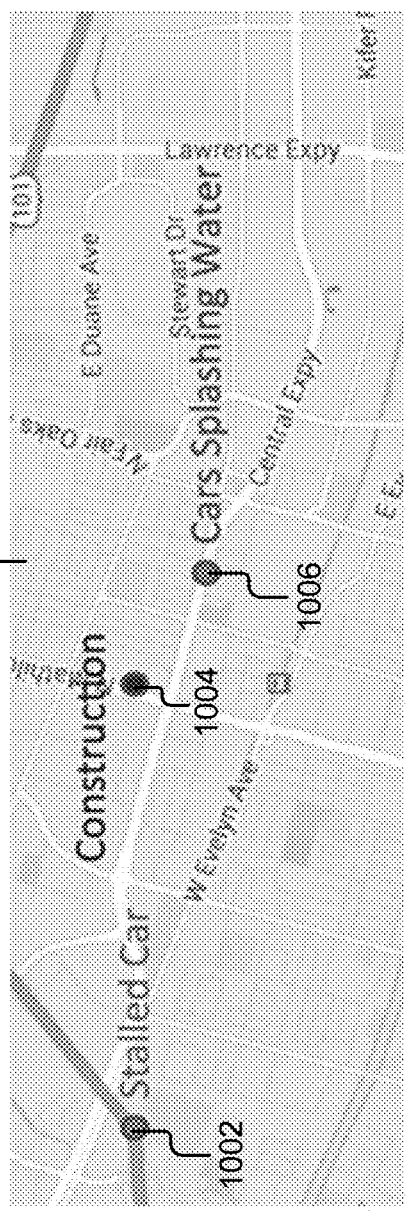
FIG. 10 illustrates an example situation map reporting current road scene situation at different locations within a particular geo-spatial area.

FIG. 10 depicts an example user interface in the form of a situation map. In some embodiments, the road scene application 109 may receive semantic descriptions describing road scene situations at different locations from different vehicles. The road scene application 109 may then reconstruct outside condition associated with each location and the interface engine 264 may generate the situation map reporting current road scene situations at these locations to the user. For example, as illustrated in FIG. 10, the situation map 1010 describes a stalled car at the location 1002, a construction zone at the location 1004 and cars splashing water at the location 1006. The situation map informs the user about the current outside conditions within a particular geo-spatial region and the user may thus avoid and/or adapt to these road scene situations as he wishes. In some embodiments, the interface engine 264 can send the graphical data to a client device 115 and/or a mobile computing system 135, causing the client device 115 and/or the mobile computing system 135 to present the user interface to the user.

In some embodiments, in response to receiving and/or determining one or more outside conditions relevant to the road segment from the semantic descriptions, the receiving vehicle may execute one or more executive routines, for example, generating the situation map as described above with reference to FIG. 10. In some embodiments, the road scene application 109 may send the outside conditions as reconstructed to a navigation application 117. The navigation application 117 may then generate navigational guidance based on the outside conditions.

As an example, multiple vehicles ahead of the first vehicle (e.g., 5 km ahead) detect a road scene situation which is described in the semantic description 900 depicted in FIG. 9. The road scene application 109 of the first vehicle analyzes the semantic descriptions received from these multiple vehicles and computes the outside condition happening 5 km ahead. In particular, it determines that three cars are moving at a distance of 3.5 m between each other in lane 1, three cars are moving moderately and two trucks are moving slowly with the average following distance of 2 s in lane 2, a car with object ID=14 has collided in lane 3 and traffic in lane 3 has stopped. The road scene application 109 may send this aggregated outside scene information to the navigation application 117. To adapt to the situation ahead, the navigation application 117 may determine that the user should avoid lane 3 because the traffic in lane 3 has stopped. The navigation application 117 may determine that the user should also avoid lane 2 because lane 2 has busy traffic with five vehicles and an object-to-object distance of 2 s is relatively small when there are two trucks (i.e., heavy vehicles) moving slowly in the lane. The navigation application 117 may then generate a navigational guidance suggesting the user to change to lane 1 when approaching the road segment for faster commute and better driving experience.

Figure 3A:
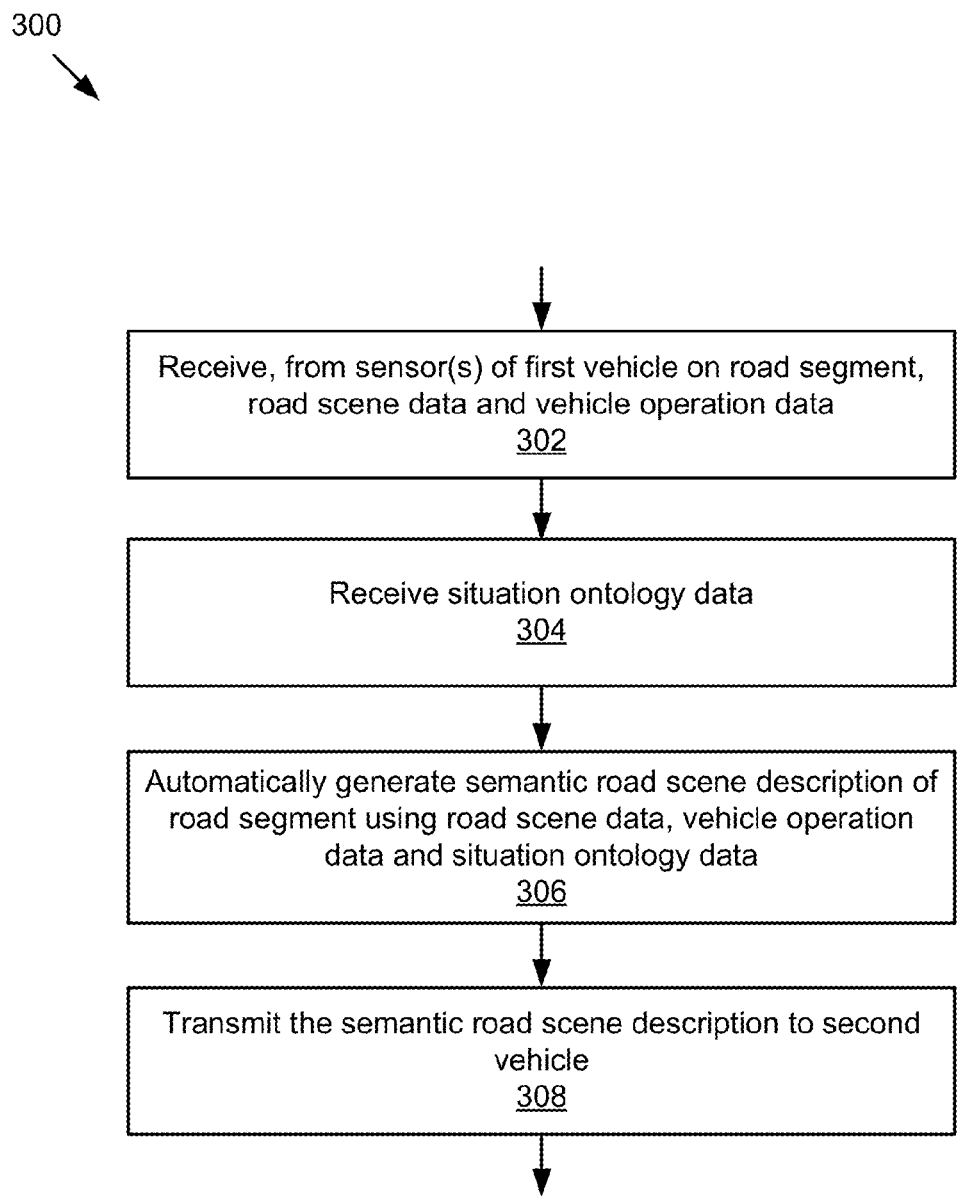
FIG. 3A is a flowchart of an example method for generating a semantic road scene description for a road segment.

FIG. 3A is a flowchart of an example method 300 for generating a semantic road scene description for a road segment. In block 302, the road scene application 109 may receive road scene data and vehicle operation data associated with a first vehicle on a road segment. In some embodiments, the road scene data may be image data captured by sensors 106 (e.g., a camera, etc.). In block 304, the road scene application 109 may receive situation ontology data. For example, the situation ontology data may be terminology data for describing road scene situation. In block 306, the semantic description generator 306 may automatically generate a semantic road scene description of the road segment using the road scene data, the vehicle operation data and the situation ontology data. In block 308, the road scene application 109 may transmit the semantic road scene description to a second vehicle. In some embodiments, the second vehicle may be a vehicle associated with the road segment (e.g., the vehicle proximate the road segment).

Figure 3B:
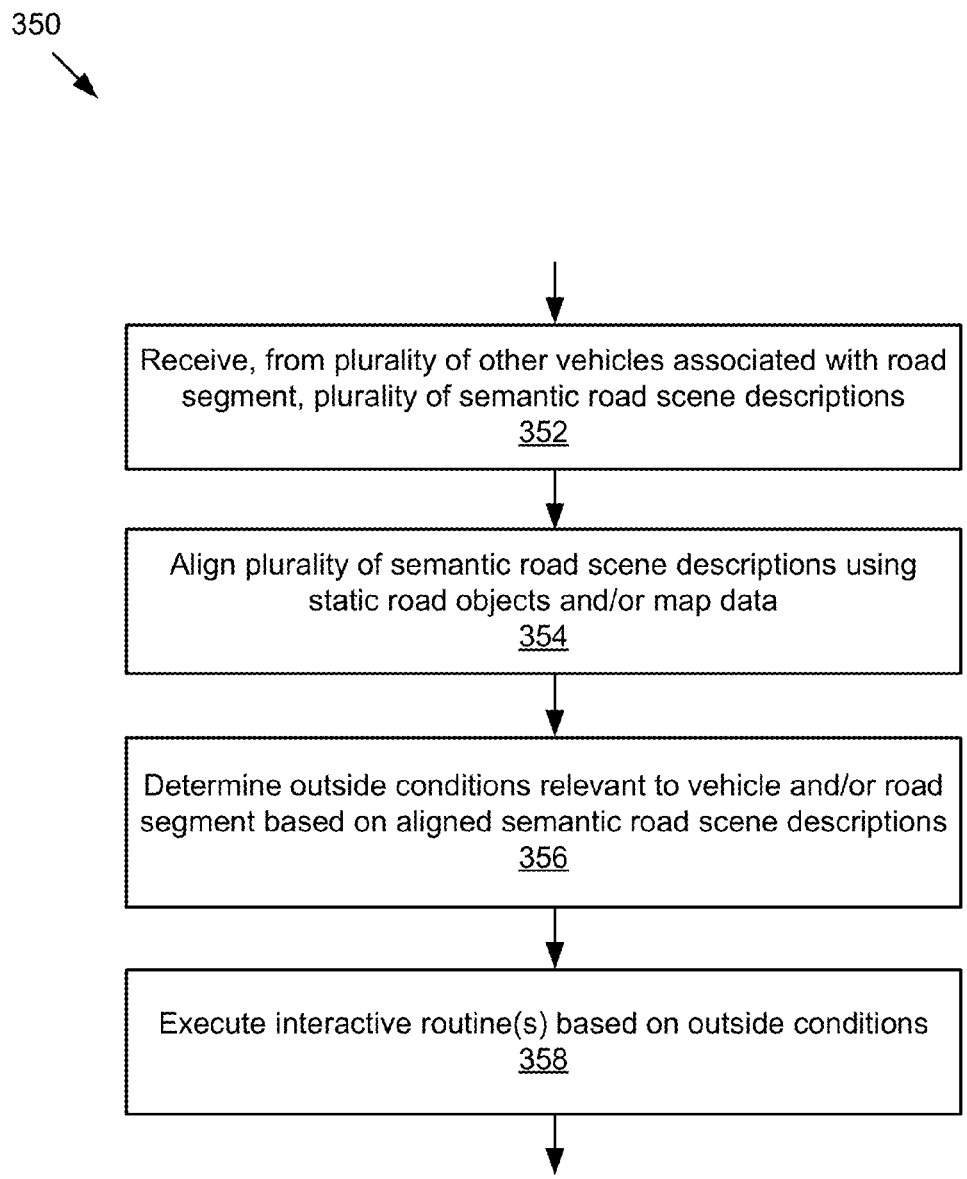
FIG. 3B is a flowchart of an example method for determining outside road scene conditions relevant to a vehicle and/or a road segment.

FIG. 3B is a flowchart of an example method 350 for determining outside road scene conditions relevant to a vehicle and/or a road segment. In block 352, the road scene application 109 of the vehicle may receive a plurality of semantic road scene descriptions from a plurality of other vehicles associated with the road segment (e.g., other vehicles proximate the road segment). In block 354, the road scene application 109 may align the plurality of semantic road scene descriptions using one or more static road objects and/or map data. Next, in block 356, the road scene application 109 may determine outside conditions relevant to the vehicle and/or the road segment based on the aligned semantic road scene descriptions. In response to determining the outside conditions, one or more interactive routines may be executed based on the determined outside conditions in block 358. For example, the road scene application 109 may generate and present a situation map to users of the vehicle. In some embodiments, the situation map may describe road scene situations at different locations within a particular geographic area relevant to the vehicle. As another example, a navigation application 117 may generate and provide navigational guidance to the users according to the outside road scene conditions determined by the road scene application 109

Figure 4:
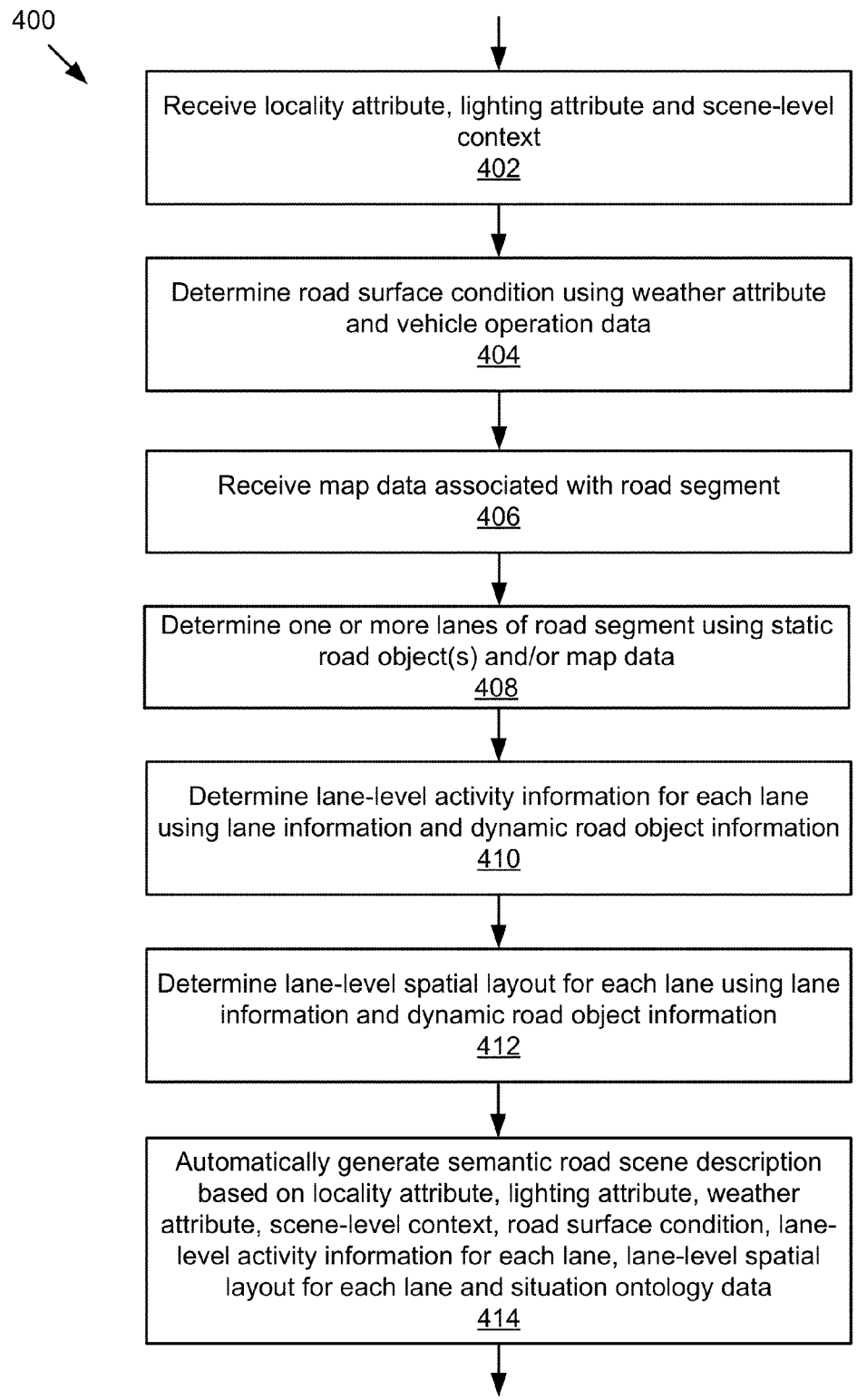
FIG. 4 is a flowchart of a further example method for generating a semantic road scene description for a road segment.

FIG. 4 is a flowchart of a further example method for generating a semantic road scene description for a road segment from perspective of a vehicle. In block 402, the semantic description generator 262 may receive a locality attribute, a lighting attribute and scene-level context from the scene processor 254. In some embodiments, the scene processor 254 may determine the locality attribute, the lighting attribute, the scene-level context and a weather attribute associated with the road segment by processing the road scene data. In some embodiments, the scene processor 254 may also detect one or more static road objects and one or more dynamic road objects associated with the road segment by processing the road scene data. Next, in block 404, the road condition estimator 260 may determine a road surface condition based on the weather attribute and the vehicle operation data associated with the vehicle.

The method 400 may proceed to receive map data associated with the road segment. In block 408, the scene processor 254 may determine one or more lanes of the road segment using the detected static road objects and/or the map data. Then, in block 410, the activity aggregator 256 may determine lane-level activity information for each lane using the lane information (e.g., lane number) and the dynamic road object information. For example, the lane-level activity information may indicate that two cars and two trucks are moving slowly in lane 2 of the road segment. In block 412, the spatial layout encoder 258 may determine lane-level spatial layout for each lane using the lane information and the dynamic road object information. For example, the lane-level spatial layout may indicate that there are four vehicles in lane 2 of the road segment. As a further example, the lane-level spatial layout may indicate that the object-to-object relationship between these four vehicles is an average following time/distance of 3 s.

The method 400 may continue by the semantic description generator 262 automatically generating 414 a semantic road scene description based on the locality attribute, the lighting attribute, the weather attribute, the scene-level context, the road surface condition, the lane-level activity information for each lane, the lane-level spatial layout for each lane and the situation ontology data. For example, the semantic description generator 262 may apply the situation ontology data to aggregate these road scene aspects into a comprehensive representation of road scene situation for effective and reliable sharing.

Figure 5:
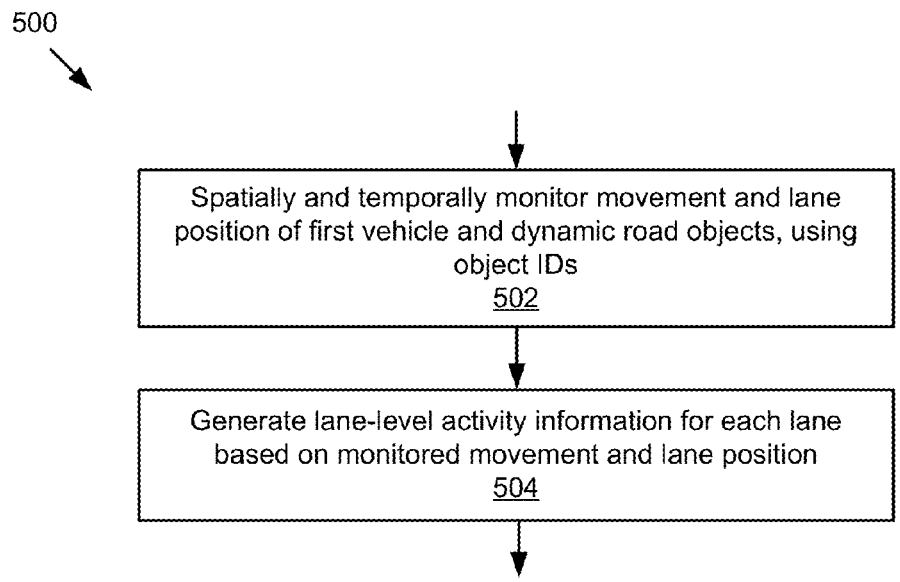
FIG. 5 is a flowchart of an example method for generating lane-level activity information.

FIG. 5 is a flowchart of an example method for generating lane-level activity information. In block 502, the activity aggregator 256 may spatially and temporally monitor movement and lane position of the one or more dynamic road objects. In some embodiments, the activity aggregator 256 may keep track of different dynamic road objects in space and in time based on a unique object ID assigned to each dynamic road object. In some embodiments, the activity aggregator 256 may also spatially and temporally monitor movement and lane position of the first vehicle. In block 504, the activity aggregator 256 may generate lane-level activity information for each lane of the road segment based on the monitored movement and the lane position of the dynamic road objects and the first vehicle. For example, the activity aggregator 256 may determine that a particular vehicle has changed to the neighboring left lane and/or traffic in a particular lane are moving smoothly at speed close to the speed limit.

Figure 6:
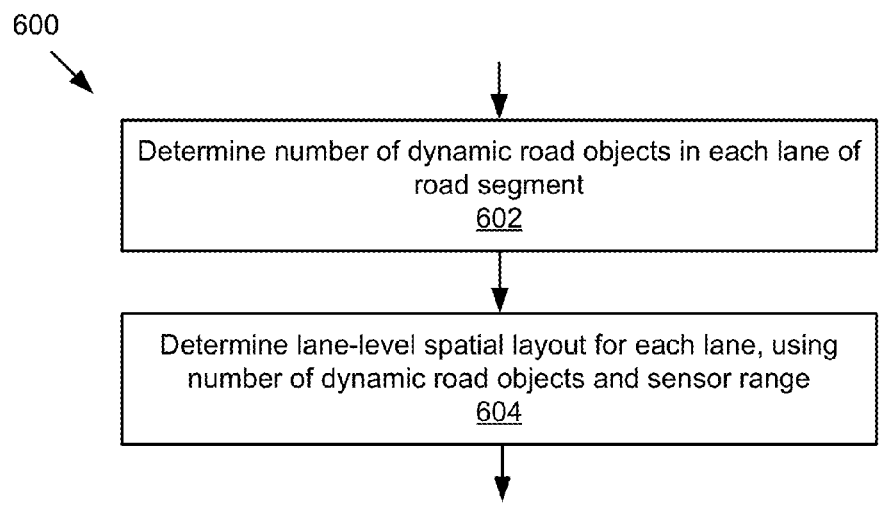
FIG. 6 is a flowchart of an example method for generating a lane-level spatial layout.

FIG. 6 is a flowchart of an example method for generating lane-level spatial layout. In block 602, the spatial layout encoder 258 may determine a number of dynamic road objects in each lane of the road segment, for example based on the images captured by the sensors 106. In block 604, the spatial layout encoder 258 may determine lane-level spatial layout for each lane using the number of dynamic road objects and the sensor range of the sensors 106. For example, the spatial layout encoder 258 may determine that there are five vehicles in lane 2 within the coverage range of 25 m of the sensors. As another example, the spatial layout encoder 258 may determine that the average distance between vehicles in lane 2 is about 5 m or a following distance of about 2.3 s.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   receiving, from one or more sensors associated with a first vehicle on a road segment, road scene data;
   receiving situation ontology data;
   detecting one or more static road objects based on the road scene data;
   detecting one or more dynamic road objects based on the road scene data;
   determining one or more lanes of the road segment based on the one or more detected static road objects;
   spatially and temporally monitoring movement and lane position of the one or more dynamic road objects;
   generating lane-level activity information for each lane based on the monitored movement and the monitored lane position of the one or more dynamic road objects;
   automatically generating a semantic road scene description of the road segment using the situation ontology data, the semantic road scene description including the lane-level activity information for each lane; and
   transmitting, via a communication network, the semantic road scene description to one or more other vehicles associated with the road segment.

2. The computer-implemented method of claim 1, wherein spatially and temporally monitoring the movement and the lane position includes:
   assigning a unique object identifier to each of the detected one or more dynamic road objects; and
   spatially and temporally monitoring the movement and the lane position of the dynamic road objects based on the assigned unique object identifier.

3. The computer-implemented method of claim 1, further comprising:

determining a number of dynamic road objects in each lane based on the road scene data;
determining a lane-level spatial layout for each lane based on the number of dynamic road objects in each lane and a sensor range of the one or more sensors associated with the first vehicle; and
wherein the generated semantic road scene description of the road segment includes the lane-level spatial layout for each lane associated with the road segment.

4. A computer-implemented method comprising:
receiving, from one or more sensors associated with a first vehicle on a road segment, road scene data and vehicle operation data;
receiving situation ontology data;
automatically generating a semantic road scene description of the road segment using the road scene data, the vehicle operation data, and the situation ontology data; and
transmitting, via a communication network, the semantic road scene description to one or more other vehicles associated with the road segment.

5. The computer-implemented method of claim 4, wherein the situation ontology data includes one or more predefined semantic terms for describing a road scene situation.

6. The computer-implemented method of claim 4, further comprising:
detecting one or more static road objects based on the road scene data; and
determining one or more lanes of the road segment based on the detected one or more static road objects.

7. The computer-implemented method of claim 6, wherein determining the one or more lanes of the road segment further comprises:
receiving map data associated with the road segment; and
determining the one or more lanes of the road segment based on the map data and the detected one or more static road objects.

8. The computer-implemented method of claim 6, further comprising:
detecting one or more dynamic road objects based on the road scene data;
determining lane-level activity information for each lane of the one or more lanes based on lane information and dynamic road object information; and
determining a lane-level spatial layout for each lane of the one or more lanes based on the lane information and the dynamic road object information.

9. The computer-implemented method of claim 8, wherein determining the lane-level activity information for each lane of the one or more lanes further comprises:
spatially and temporally monitoring movement and lane position of the one or more dynamic road objects; and
generating the lane-level activity information for each lane of the one or more lanes based on the monitored movement and the monitored lane position of the one or more dynamic road objects.

10. The computer-implemented method of claim 9, wherein spatially and temporally monitoring the movement and the lane position includes:
assigning a unique object identifier to each of the detected one or more dynamic road objects; and
spatially and temporally monitoring the movement and the lane position of the detected one or more dynamic road objects based on the assigned unique object identifier.

11. The computer-implemented method of claim 8, wherein determining the lane-level spatial layout for each lane further comprises:
determining a number of dynamic road objects in each lane based on the road scene data; and
determining the lane-level spatial layout for each lane based on the number of dynamic road objects in each lane and a sensor range of the one or more sensors associated with the first vehicle.

12. The computer-implemented method of claim 6, further comprising:
determining one or more of a locality attribute, a lighting attribute, a weather attribute, and a scene-level context associated with the road segment based on the road scene data;
determining a road surface condition associated with the road segment based on the weather attribute and the vehicle operation data;
determining lane-level activity information for each lane;
determining a lane-level spatial layout for each lane; and
wherein the generated semantic road scene description of the road segment includes one or more of the locality attribute, the lighting attribute, the weather attribute, the scene-level context, the road surface condition, the lane-level activity information for each lane, and the lane-level spatial layout for each lane associated with the road segment.

13. The computer-implemented method of claim 4, further comprising:
receiving, from two or more vehicles associated with the road segment, two or more other semantic road scene descriptions, respectively;
aligning the two or more other semantic road scene descriptions based on one or more aspects in each of the two or more other semantic road scene descriptions;
determining one or more outside conditions relevant to the road segment based on the aligned two or more other semantic road scene descriptions; and
executing one or more interactive routines based on the one or more outside conditions.

14. The computer-implemented method of claim 13, wherein at least one aspect of each of the two or more other semantic road scene descriptions is lane information and aligning the two or more other semantic road scene descriptions includes:
aligning the two or more other semantic road scene descriptions based on the lane information included in each of the two or more other semantic road scene descriptions.

15. The computer-implemented method of claim 13, further comprising receiving map data associated with the road segment, and wherein aligning the two or more other semantic road scene descriptions includes:
aligning the two or more other semantic road scene descriptions based on lane information included in each of the two or more other semantic road scene descriptions and the map data.

16. The computer-implemented method of claim 13, wherein executing the one or more interactive routines includes:
generating navigational guidance based on the one or more outside conditions; and
providing the navigational guidance to a user of the first vehicle.

17. The computer-implemented method of claim 4, wherein the one or more other vehicles are within a radio frequency communication range with the first vehicle and the communication network is one of a vehicle to vehicle network and a vehicle to infrastructure network.

18. The computer-implemented method of claim 4, wherein the road scene data includes image data captured by one or more optical sensors.

19. A system comprising:
one or more processors;
one or more memories storing instructions that, when executed by the one or more processors, cause the system to:
receive, from one or more sensors associated with a first vehicle on a road segment, road scene data and vehicle operation data;
receive situation ontology data;
automatically generate a semantic road scene description of the road segment using the road scene data, the vehicle operation data, and the situation ontology data; and
transmit, via a communication network, the semantic road scene description to one or more other vehicles associated with the road segment.

20. The system of claim 19, wherein the situation ontology data includes one or more predefined semantic terms for describing a road scene situation.

21. The system of claim 19, wherein the instructions, when executed by the one or more processors, further cause the system to:
detect one or more static road objects based on the road scene data; and
determine one or more lanes of the road segment based on the detected one or more static road objects.

22. The system of claim 21, wherein to determine the one or more lanes of the road segment includes:
receiving map data associated with the road segment; and
determining the one or more lanes of the road segment based on the map data and the detected one or more static road objects.

23. The system of claim 21, wherein the instructions, when executed by the one or more processors, further cause the system to:
detect one or more dynamic road objects based on the road scene data;
determine lane-level activity information for each of the one or more lanes based on lane information and dynamic road object information; and
determine a lane-level spatial layout for each lane of the one or more lanes based on the lane information and the dynamic road object information.

24. The system of claim 23, wherein to determine the lane-level activity information for each lane of the one or more lanes includes:
spatially and temporally monitoring movement and lane position of the one or more dynamic road objects; and
generating the lane-level activity information for each lane of the one or more lanes based on the monitored movement and the monitored lane position of the one or more dynamic road objects.

25. The system of claim 24, wherein spatially and temporally monitoring the movement and the lane position includes:
assigning a unique object identifier to each of the detected one or more dynamic road objects; and
spatially and temporally monitoring the movement and the lane position of the dynamic road objects based on the assigned unique object identifier.

26. The system of claim 23, wherein to determine the lane-level spatial layout for each lane of the one or more lanes includes:
determining a number of dynamic road objects in each lane of the one or more lanes based on the road scene data; and
determining the lane-level spatial layout for each lane of the one or more lanes based on the number of dynamic road objects in each lane of the one or more lanes and a sensor range of the one or more sensors associated with the first vehicle.

27. The system of claim 21, wherein the instructions, when executed by the one or more processors, further cause the system to:
determine one or more of a locality attribute, a lighting attribute, a weather attribute, and a scene-level context associated with the road segment based on the road scene data;
determine a road surface condition associated with the road segment based on the weather attribute and the vehicle operation data;
determine lane-level activity information for each lane of the one or more lanes;
determine a lane-level spatial layout for each lane of the one or more lanes; and
wherein the generated semantic road scene description of the road segment includes one or more of the locality attribute, the lighting attribute, the weather attribute, the scene-level context, the road surface condition, the lane-level activity information for each lane of the one or more lanes, and the lane-level spatial layout for each lane of the one or more lanes associated with the road segment.

28. The system of claim 19, wherein the instructions, when executed by the one or more processors, further cause the system to:
receive, from two or more vehicles associated with the road segment, two or more other semantic road scene descriptions, respectively;
align the two or more other semantic road scene descriptions based on one or more aspects in each of the two or more other semantic road scene descriptions;
determine one or more outside conditions relevant to the road segment based on the aligned two or more semantic road scene descriptions; and
execute one or more interactive routines based on the one or more outside conditions.

29. The system of claim 28, wherein at least one aspect of each of the two or more other semantic road scene descriptions is lane information and to align the two or more other semantic road scene descriptions includes:
aligning the two or more other semantic road scene descriptions based on the lane information included in each of the two or more other semantic road scene descriptions.

30. The system of claim 28, wherein the instructions, when executed by the one or more processors, further cause the system to receive map data associated with the road segment and wherein aligning the two or more other semantic road scene descriptions includes:
aligning the two or more other semantic road scene descriptions based on lane information included in each of the two or more other semantic road scene descriptions and the map data.

31. The system of claim 28, wherein to execute the one or more interactive routines includes:

generating navigational guidance based on the one or more outside conditions; and providing the navigational guidance to a user of the first vehicle.

32. The system of claim 19, wherein the one or more other vehicles are within a radio frequency communication range with the first vehicle and the communication network is one of a vehicle to vehicle network and a vehicle to infrastructure network.

33. The system of claim 19, wherein the road scene data includes image data captured by one or more optical sensors.

* * * * *